(12) United States Patent
Narahara et al.

(10) Patent No.: US 11,548,558 B2
(45) Date of Patent: Jan. 10, 2023

(54) FRONT VEHICLE-BODY STRUCTURE OF VEHICLE

(71) Applicant: MAZDA MOTOR CORPORATION, Hiroshima (JP)

(72) Inventors: Takashi Narahara, Aki-gun (JP); Nobuyuki Shibutake, Aki-gun (JP); Yasushi Ishikawa, Aki-gun (JP); Yuichi Morita, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 110 days.

(21) Appl. No.: 17/231,431

(22) Filed: Apr. 15, 2021

(65) Prior Publication Data

US 2022/0001927 A1  Jan. 6, 2022

(30) Foreign Application Priority Data

Jul. 1, 2020 (JP) .............................. JP2020-113724

(51) Int. Cl.
| | |
|---|---|
| *B60J 7/00* | (2006.01) |
| *B62D 21/15* | (2006.01) |
| *B60R 19/02* | (2006.01) |
| *B60R 19/34* | (2006.01) |

(52) U.S. Cl.
CPC .......... *B62D 21/152* (2013.01); *B60R 19/023* (2013.01); *B60R 19/34* (2013.01)

(58) Field of Classification Search
CPC .... H04W 72/042; H04W 48/20; Y02E 60/10; A61P 35/00; H04N 19/176;
(Continued)

(56) References Cited

U.S. PATENT DOCUMENTS 9,168,883 B1 * 10/2015 Midoun ............... B62D 25/082
9,630,578 B1 *  4/2017 Nusier .................... B60R 19/12
(Continued)

FOREIGN PATENT DOCUMENTS

| EP | 1477371 A2 | 11/2004 |
|---|---|---|
| EP | 2979932 A1 | 2/2016 |

(Continued)

OTHER PUBLICATIONS

Extended European search report issued by the European Patent Office dated Nov. 8, 2021, which corresponds to European Patent Application No. 21181240.9-1132 and is related to U.S. Appl. No. 17/231,431.

*Primary Examiner* — Kiran B Patel
(74) *Attorney, Agent, or Firm* — Studebaker & Brackett PC

(57) ABSTRACT

A front vehicle-body structure comprises a crash can fixed to a front end of a front frame. The crash can comprises an upper face portion, a lower face portion, a pair of side face portions, corner portions respectively positioned between the side face portion and the upper face portion and between the side face portion and the lower face portion, a first fragile portion provided at each of the corner portions, and a second fragile portion provided at each of the side face portions. The first fragile portion is configured to be deformed before the second fragile portion when a collision load applied toward a vehicle rearward side is inputted to an extension portion of a bumper beam. The second fragile portion is configured to be deformed before the front frame when the collision load applied toward the vehicle rearward side is inputted to the extension portion.

20 Claims, 17 Drawing Sheets

(58) Field of Classification Search
CPC ............ B60R 21/0132; B60R 21/0134; B60R 21/013; B60R 21/0136; B60R 19/00
See application file for complete search history.

(56) References Cited

U.S. PATENT DOCUMENTS

| | | | | |
|---|---|---|---|---|
| 2004/0207217 | A1* | 10/2004 | Muller | B60R 19/34 |
| | | | | 293/133 |
| 2010/0066124 | A1* | 3/2010 | Terada | B60R 19/34 |
| | | | | 296/187.09 |
| 2010/0102592 | A1* | 4/2010 | Tyan | B60R 19/34 |
| | | | | 296/187.09 |
| 2012/0104777 | A1* | 5/2012 | Ghannam | B60R 19/48 |
| | | | | 293/133 |
| 2015/0054306 | A1* | 2/2015 | Kito | B62D 25/08 |
| | | | | 296/193.11 |
| 2015/0142271 | A1* | 5/2015 | Cuddihy | B60R 19/16 |
| | | | | 180/274 |
| 2018/0056906 | A1* | 3/2018 | Wu | B60R 19/18 |
| 2019/0232904 | A1* | 8/2019 | Kurogi | B60R 19/18 |
| 2020/0086920 | A1* | 3/2020 | Okamoto | B62D 21/155 |
| 2021/0221445 | A1* | 7/2021 | Kuwada | B62D 25/04 |
| 2021/0300477 | A1* | 9/2021 | Kubota | B62D 25/08 |

FOREIGN PATENT DOCUMENTS

| | | |
|---|---|---|
| JP | 2012-126217 A | 7/2012 |
| JP | 2019-130972 A | 8/2019 |
| WO | 2014/087219 A1 | 6/2014 |
| WO | 2015/036831 A1 | 3/2015 |

\* cited by examiner

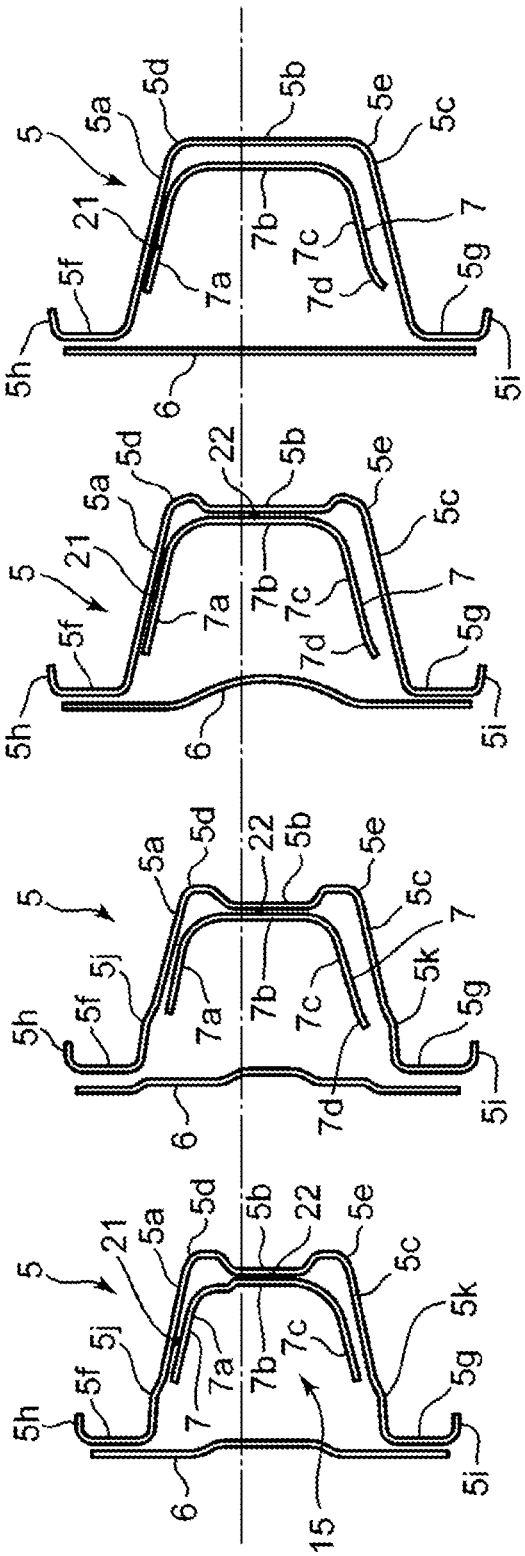
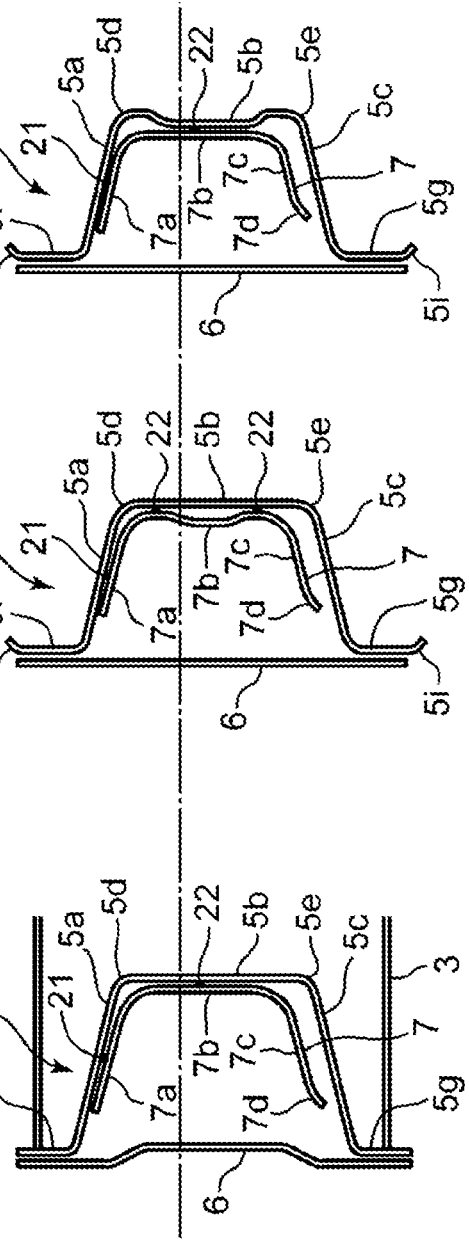
FIG. 17A
FIG. 17B
FIG. 17C
FIG. 17D
FIG. 17E
FIG. 17F
FIG. 17G

FRONT VEHICLE-BODY STRUCTURE OF VEHICLE

BACKGROUND OF THE DISCLOSURE

The present disclosure relates to a front vehicle-body structure of a vehicle.

In the conventional front vehicle-body structure of the vehicle, there is provided a crash box (hereafter, referred to as a "crash can" in the present specification) which is configured to be more easily deformable than a bumper and provided on a vehicle rearward side of the bumper in order to absorb a collision load applied from a vehicle forward side in a vehicle collision.

For example, a front vehicle-body structure described in Japanese Patent Laid-Open Publication No. 2019-130972 (US2019/0232904 A1) comprises a pair of side members (hereafter, referred to as "front frames" in the present specification) which extend in a vehicle longitudinal direction, a pair of crash cans which are fixed to respective front ends of the front frames, and a bumper which extends in a vehicle width direction and fixed to respective front ends of the crash cans.

This crash can is configured to be easily deformable in the vehicle collision, which is a cylindrical member having a rectangular-shaped cross section which is made of a pressed aluminum plate. Further, a bending bead which becomes a causing point to cause deformation of the crash can is provided at a side face of the crash can such that it extends in a vertical direction. While, this bending bead extending in the vertical direction has a constant width and depth, both ends of the bending bead are positioned in a surface of the side face of the crash can. That is, an end portion of the bending bead is located at a position which is apart from a corner portion of the crash can.

In these days, in a case of a small-overlap collision, that is—in a case where an object (an oncoming car, an on-road installation, and the like) partially collides with an end portion of the bumper which is positioned on an outward side, in the vehicle width direction, of the front frame from the vehicle forward side, it is required that the collision load is transmitted from the bumper to the crash can and the front frame, thereby absorbing collision energy by both deformations of the crash can and the front frame.

According to the above-described structure in which the bead is partially formed at the side face of the crash can, however, since an initial collision load is transmitted to the front frame by way of the corner portion of the crash can which has the high rigidity before the crash can is deformed at a point of the bending bead in an initial stage of the vehicle collision, an excessively large load comes to act on the front frame. Consequently, there may occur two problems in that the transmission quantity of the initial collision load to the front frame cannot be suppressed by the bending bead and the energy-absorption quantity cannot be secured during the deformation of the crash can.

Further, in a case where the width and depth of the bending bead are small, the transmission quantity of the initial collision load which is transmitted by way of the corner portion cannot be suppressed even if the bending bead is simply extended up to the corner portion. Meanwhile, in a case where the width and depth of the bending bead are large, the energy-absorption quantity cannot be secured during the deformation of the crash can. That is, the structure where the bending bead is simply extended up to the corner portion may not be able to solve the above-described two problems.

SUMMARY OF THE DISCLOSURE

The present disclosure has been devised in view of the above-described matters, and an object of the present disclosure is to provide a front vehicle-body structure of a vehicle which can compatibly attain suppression of the transmission quantity of the initial collision load to the front frame in the vehicle collision and securement of the energy-absorption quantity during the deformation of the crash can.

The front vehicle-body structure of the vehicle of the present disclosure comprises a pair of front frames provided to be separated, in a vehicle width direction, from each other and extending in a vehicle longitudinal direction, a pair of crash cans fixed to respective front ends of the pair of front frames and extending in the vehicle longitudinal direction, and a bumper beam fixed to respective front ends of the pair of crash cans and extending in the vehicle width direction, wherein the bumper beam comprises crash-can fixation portions which are respectively fixed to the pair of crash cans and extension portions which respectively extend outwardly, in the vehicle width direction, from the crash-can fixation portions, each of the pair of crash cans comprises an upper face portion which extends in the vehicle longitudinal direction and forms an upper face of the crash can in a vehicle elevational view, a lower face portion which extends in the vehicle longitudinal direction and forms a lower face of the crash can in the vehicle elevational view, a pair of side face portions which respectively interconnect both end portions, in the vehicle width direction, of the upper face portion and the lower face portion, corner portions which are respectively positioned between the side face portion and the upper face portion and between the side face portion and the lower face portion, a first fragile portion which is provided at each of the corner portions, and a second fragile portion which is provided at at least one of the upper face portion, the lower face portion, and the pair of side face portions, the first fragile portion is configured to be deformed before the second fragile portion when a collision load which is applied toward a vehicle rearward side is inputted to the extension portion of the bumper beam, and the second fragile portion is configured to be deformed before the front frame when the collision load applied toward the vehicle rearward side is inputted to the extension portion of the bumper beam.

According to the front vehicle-body structure of the vehicle of the present disclosure, since the first fragile portion provided at the corner portion of the crash can is deformed and absorbs the collision energy first by the initial collision load transmitted by way of the corner portion when the collision load applied toward the vehicle rearward side is inputted to the extension portion positioned at an end portion, in the vehicle width direction, of the bumper beam (i.e., in the small overlap collision), the transmission quantity of the collision load from the crash can to the front frame can be suppressed. Further, since the second fragile portion provided at at least one of the upper face portion, the lower face portion, and the pair of side face portions is configured not to be deformed before the first fragile portion, the collision energy can be properly absorbed by whole-part deformation of the first fragile portion and the second fragile portion, maintaining the high transmission quantity of the collision load, compared to a case where the second fragile portion is configured to have the same deformability as the first fragile portion. Consequently, the suppression of the transmission quantity of the initial collision load to the front frame in the vehicle collision and the securement of the energy-absorption quantity during the deformation of the crash can can be compatibly attained.

It is preferable in the above-described front vehicle-body structure of the vehicle that the second fragile portion extend continuously from the first fragile portion in the vehicle width direction or in a vertical direction along at least one of the upper face portion, the lower face portion, and the side face portions.

According to this structure, the collision load is smoothly transmitted to the second fragile portion extending in the vehicle width direction or in the vertical direction continuously from the first fragile portion subsequently to the deformation of the first fragile portion which is conducted first by the initial collision in the vehicle collision, thereby enabling continuous deformation of the first fragile portion and the second fragile portion, so that the whole-part deformation of the first fragile portion and the second fragile portion can be securely attained, maintaining the high transmission quantity of the collision load, and consequently the collision energy can be properly absorbed.

It is preferable in the above-described front vehicle-body structure of the vehicle that the first fragile portion be made of a first bead which is configured such that the corner portion of the crash can is partially recessed, the second fragile portion be made of a second bead which is configured such that the above-described at least one of the upper face portion, the lower face portion, and the pair of side face portions of the crash can is partially recessed, a depth of the first bead be greater than that of the second bead, and a width, in the vehicle longitudinal direction, of the first bead is greater than that of the second bead.

According to this structure, the above-described compatibility of the suppression of the transmission quantity of the initial collision load to the front frame in the vehicle collision and the securement of the energy-absorption quantity during the deformation of the crash can is enabled by the first bead and the second bead which have the different depth and width from each other as described above.

It is preferable in the above-described front vehicle-body structure of the vehicle that the corner portion positioned on an upper-face side of the crash can and the corner portion positioned on a lower-face side of the crash can be respectively configured to extend up to a foremost position, in the vehicle longitudinal direction, of a back face of the bumper beam which faces rearwardly.

According to this structure, the collision load inputted to the crash can from the bumper beam in the vehicle collision can be transmitted directly to the corner portions which are respectively positioned on the upper-face side and the lower-face side of the crash can at the foremost position, in the vehicle longitudinal direction, of the back face of the bumper beam which faces rearwardly. Consequently, the suppression of the transmission quantity of the initial collision load to the front frame in the vehicle collision and the securement of the energy-absorption quantity during the deformation of the crash can can be compatibly attained securely.

It is preferable in the above-described front vehicle-body structure of the vehicle that the crash can be configured to have a cross-shaped cross section in the vehicle elevational view, each of the side face portions comprise a central side face part, an upper side face part which is positioned on an upper-and-inward side, in the vehicle width direction, of the central side face part, and a lower side face part which is positioned on a lower-and-inward side, in the vehicle width direction, of the central side face part, the upper face portion comprise a central upper side part and a pair of side upper face parts which are positioned on lower-and-both sides, in the vehicle width direction, of the central upper side part, the lower face portion comprise a central lower side part and a pair of side lower face parts which are positioned on upper-and-both sides, in the vehicle width direction, of the central lower side part, the corner portion comprise a central upper-side corner part which is positioned between the upper side face part and the central upper face part, a side upper-side corner part which is positioned between the central side face part and the side upper face part, a central lower-side corner part which is positioned between the lower side face part and the central lower face part, and a side lower-side corner part which is positioned between the central side face part and the side lower face part, the first fragile portion be provided at each of the central upper-side corner part, the side upper-side corner part, the central lower-side corner part, and the side lower-side corner part, and the second fragile portion be provided at each of the central side face part, the side upper side face, and the side lower side face part.

According to this structure, since the first fragile portions are provided at all of the corner portions of the crash can, i.e., at the central upper-side corner part, the side upper-side corner part, the central lower-side corner part, and the side lower-side corner part, even in a manner that the crash can is configured to have the cross-shaped cross section in the vehicle elevational view, the first fragile portions provided at the corner portions of the crash can are deformed and absorb the collision energy first by the initial collision load transmitted by way of these corner portions in the vehicle collision, so that the transmission quantity of the collision load from the crash can to the front frame can be suppressed. Meanwhile, the second fragile portions which are configured not to be more easily deformable than the first fragile portions are provided at plural parts which constitute the side-face portions of the crash can, i.e., at the central side face part, the side upper side face, and the side lower side face part, the collision energy can be properly absorbed by the whole-part deformation of the first fragile portions and the second fragile portions, maintaining the high transmission quantity of the collision load. Consequently, even if the crash can having the cross-shaped cross section is used, the suppression of the transmission quantity of the initial collision load to the front frame in the vehicle collision and the securement of the energy-absorption quantity during the deformation of the crash can can be compatibly attained securely.

It is preferable in the above-described front vehicle-body structure of the vehicle that the bumper beam comprises a pair of flange portions which protrude upwardly and downwardly and extend in the vehicle width direction, and the corner portions where the first fragile portions are provided are located at positions which respectively overlap with the pair of flange portions in the vehicle elevational view.

According to this structure, the corner portion provided with the first fragile portion can receive the collision load which is inputted from the bumper beam to the crash can from the vehicle forward side directly from the pair of flange portions of the bumper beam. Therefore, the initial load can be securely transmitted to the corner portions in the vehicle collision, so that the collision energy can be absorbed properly by making the first fragile portion provided at the corner portions be deformed early.

The present disclosure will become apparent from the following description which refers to the accompanying drawings.

BRIEF DESCRIPTION OF THE DRAWINGS

FIGS. 17A-17G are sectional views of the bumper beam shown in FIG. 16 at respective positions A-G.

DETAILED DESCRIPTION OF THE DISCLOSURE

Figure 1:
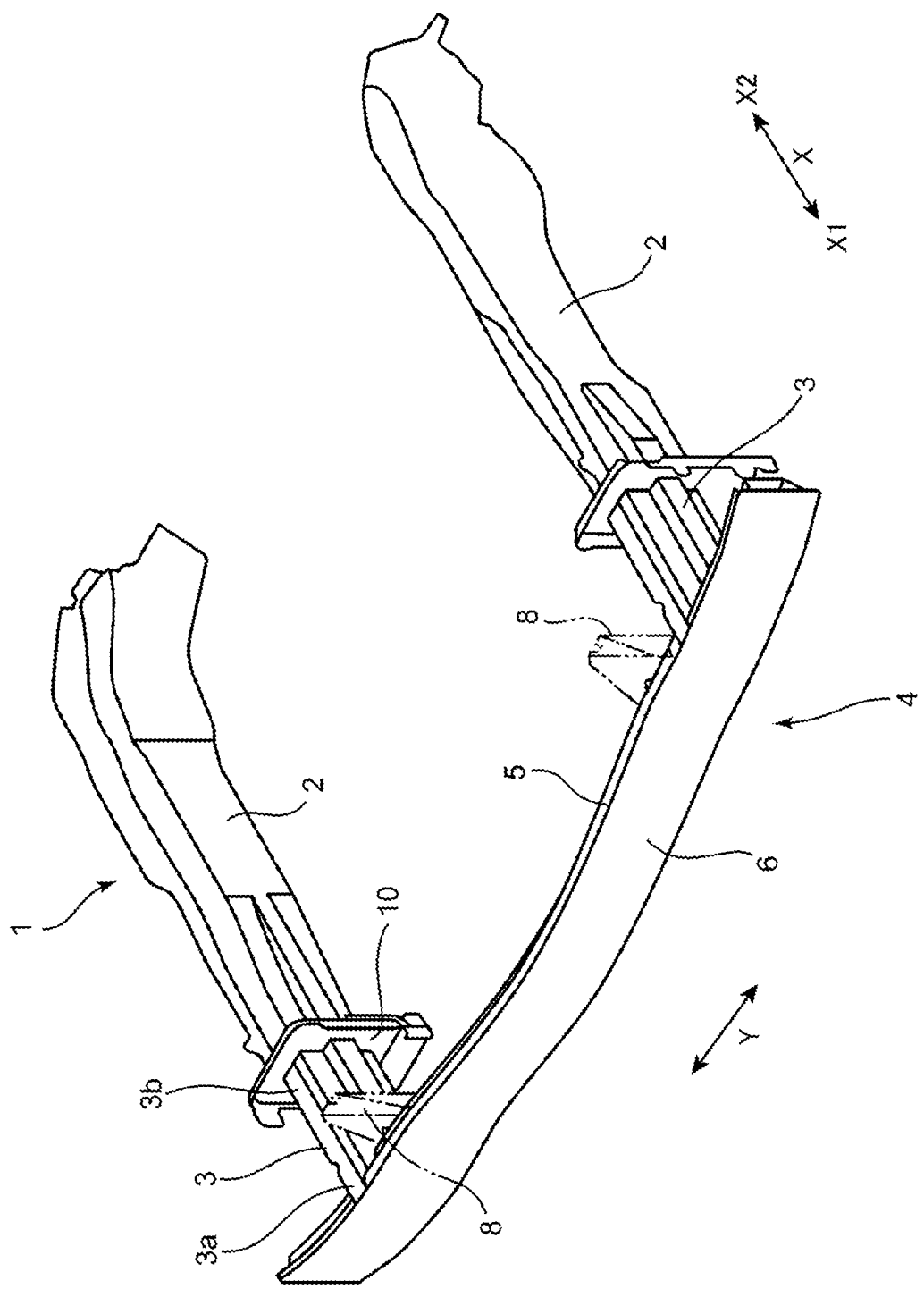
FIG. 1 is a perspective view of a whole structure of a front vehicle-body structure of a vehicle according to an embodiment of the present disclosure, when viewed obliquely from a forward-and-upper side.

Hereafter, a preferable embodiment of the present disclosure will be described specifically referring to the attached drawings.

A front vehicle-body structure 1 of a vehicle of the present embodiment is, as shown in FIGS. 1-6, an assembly of parts which receive a collision load when the vehicle collides with an object (an oncoming car, an on-road installation, and the like) from a vehicle forward side X1, which specifically comprises a pair of front frames 2, a pair of crash cans 3, and a bumper 4 which includes a bumper beam 5 and extends in a vehicle width direction Y.

Figure 2:
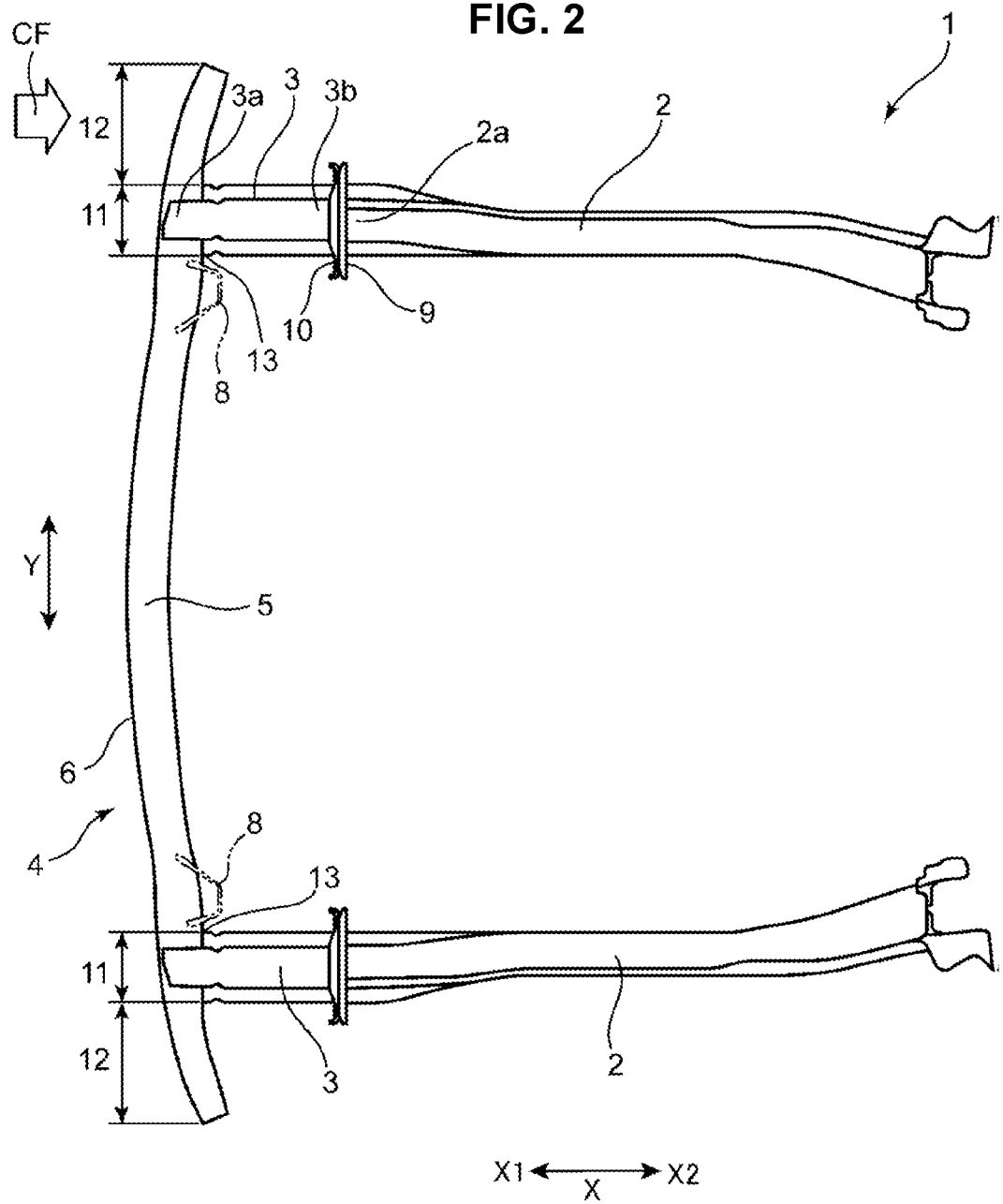
FIG. 2 is a plan view of the front vehicle-body structure shown in FIG. 1.
Figure 3:
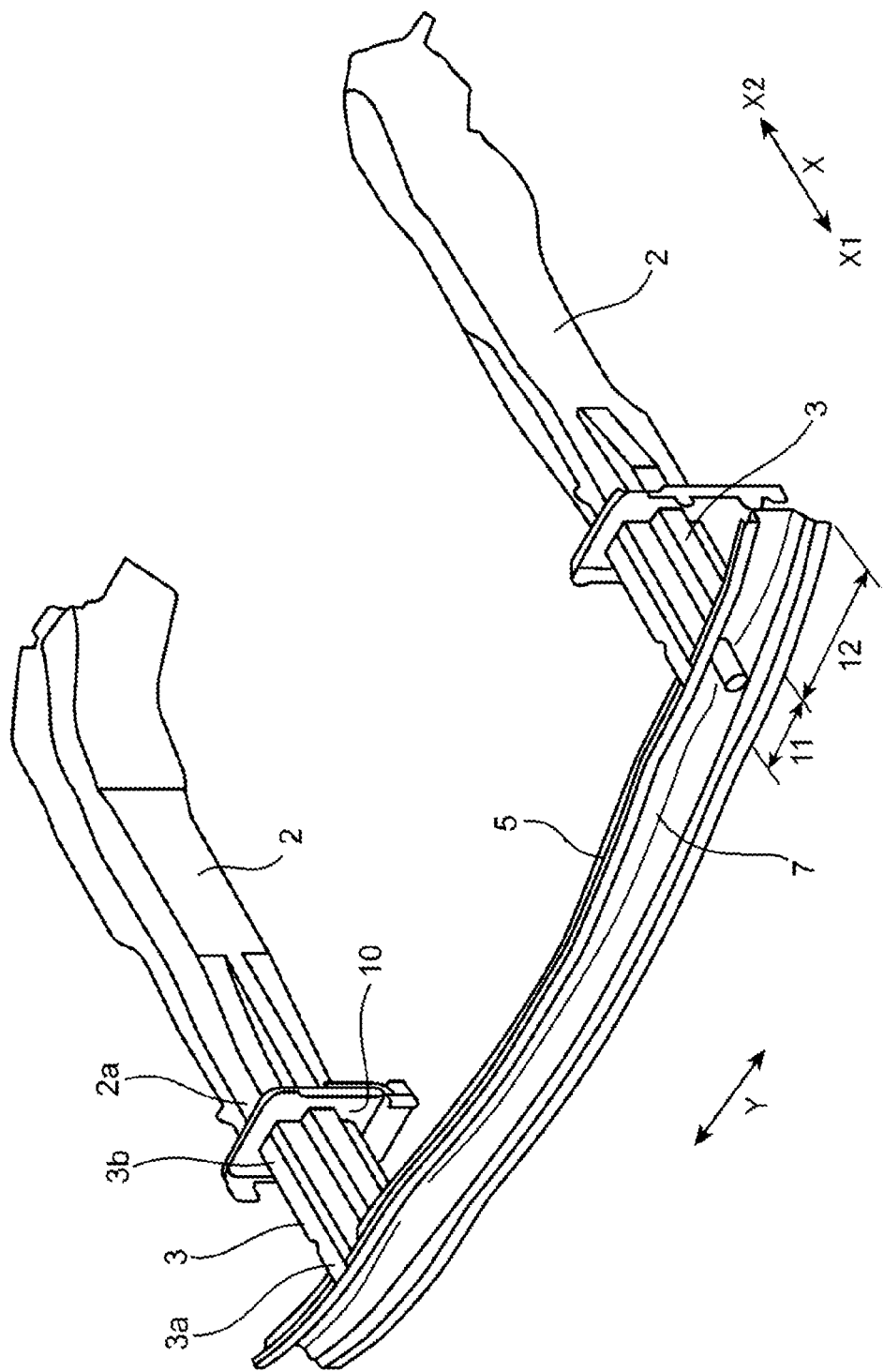
FIG. 3 is a perspective view of the front vehicle-body structure shown in FIG. 1, in which a front plate of a bumper is removed.
Figure 4:
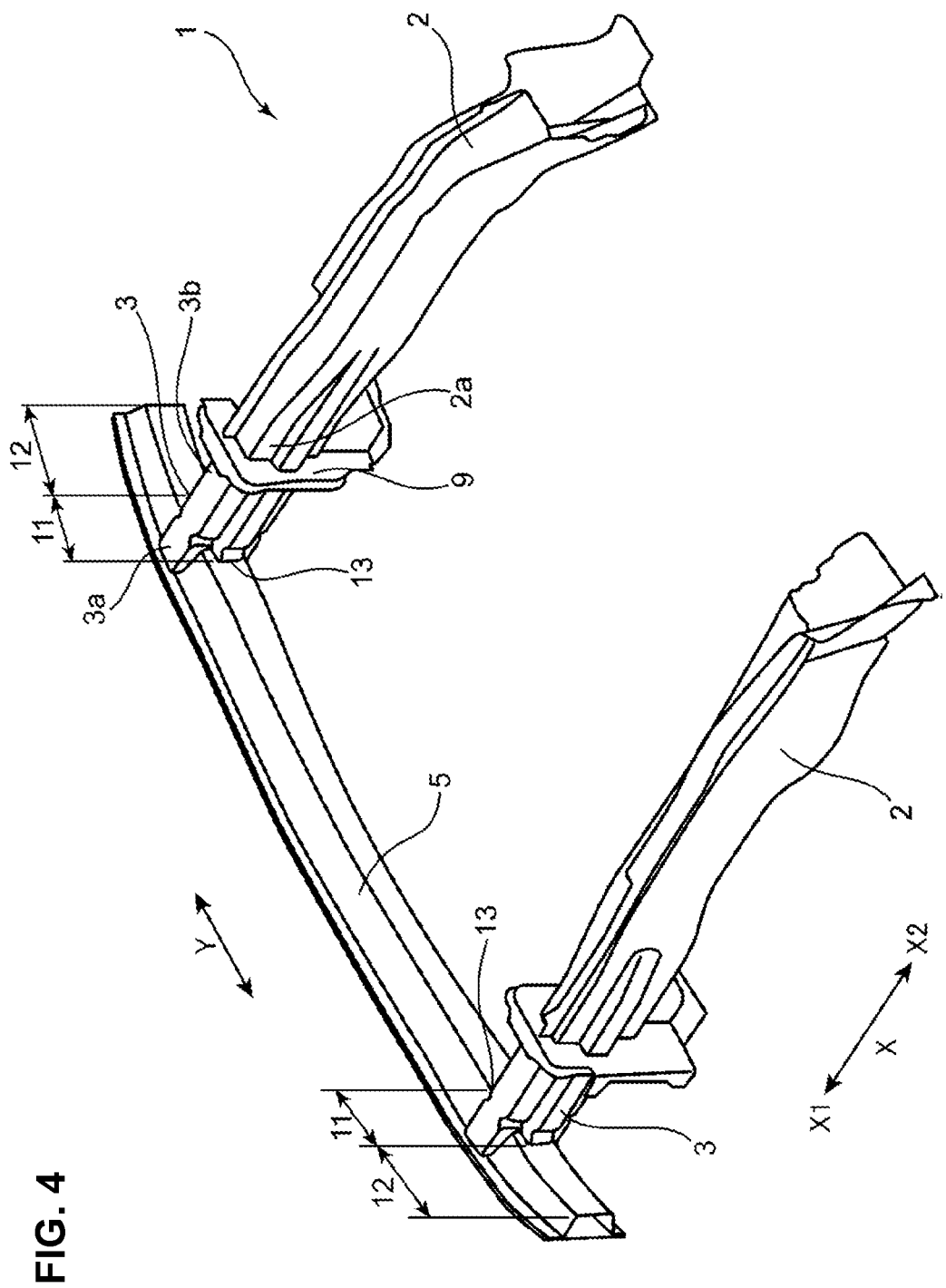
FIG. 4 is a perspective view of the front vehicle-body structure shown in FIG. 1, when viewed obliquely from a rearward-and-upper side.
Figure 5:
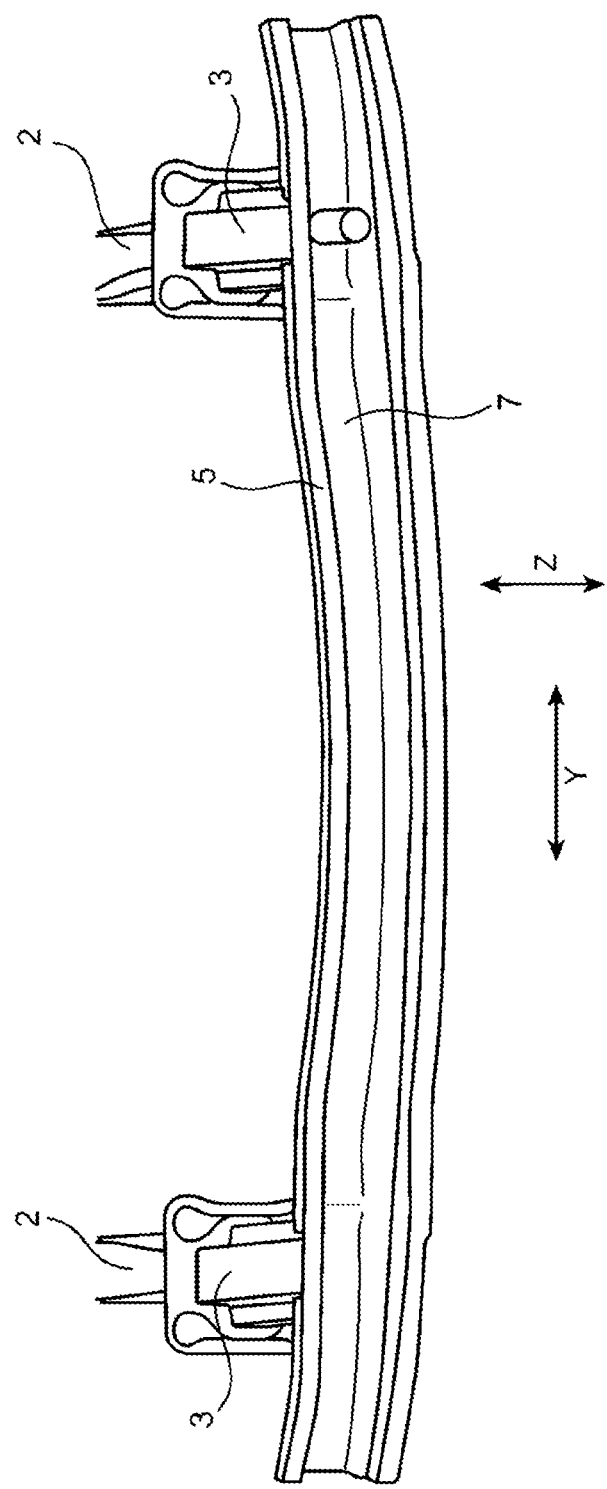
FIG. 5 is an enlarged perspective view of the front vehicle-body structure shown in FIG. 1, in which the front plate of the bumper is removed.
Figure 6:
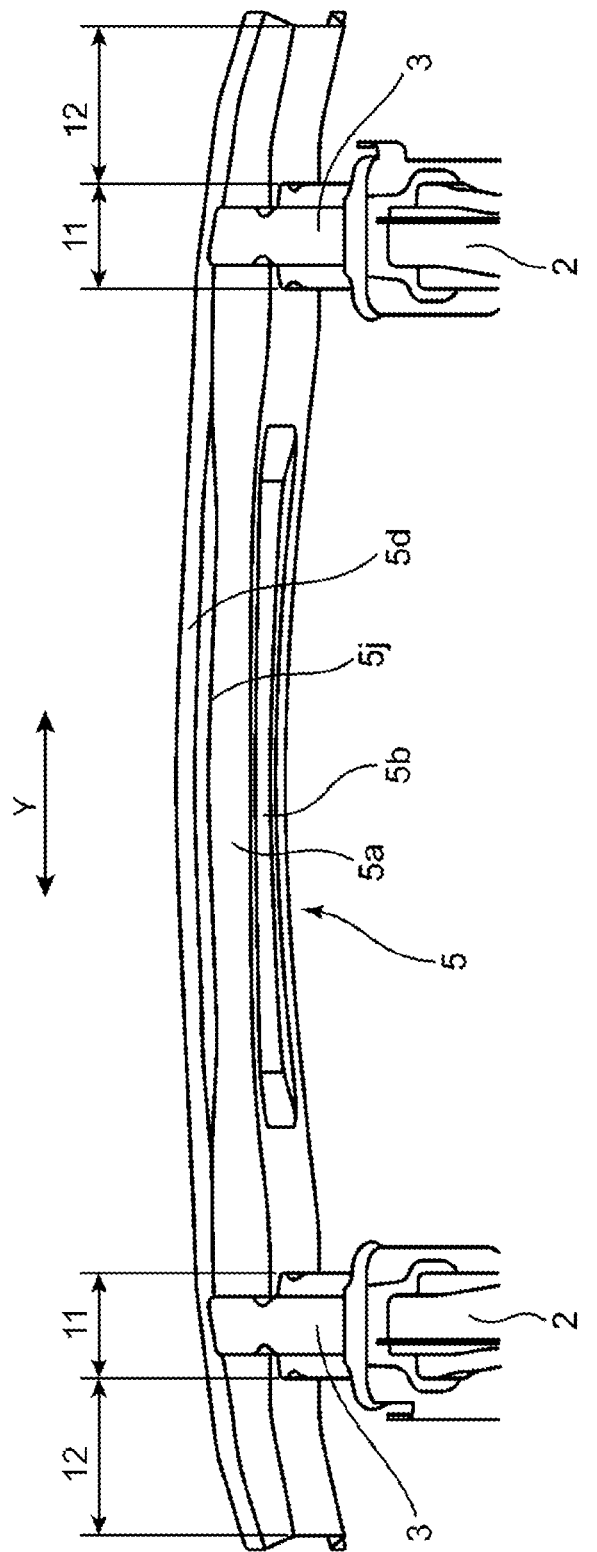
FIG. 6 is an enlarged perspective view of a bumper beam of the bumper and its surrounding portion in the front vehicle-body structure shown in FIG. 1, when viewed obliquely from the rearward-and-upper side.
Figure 7:
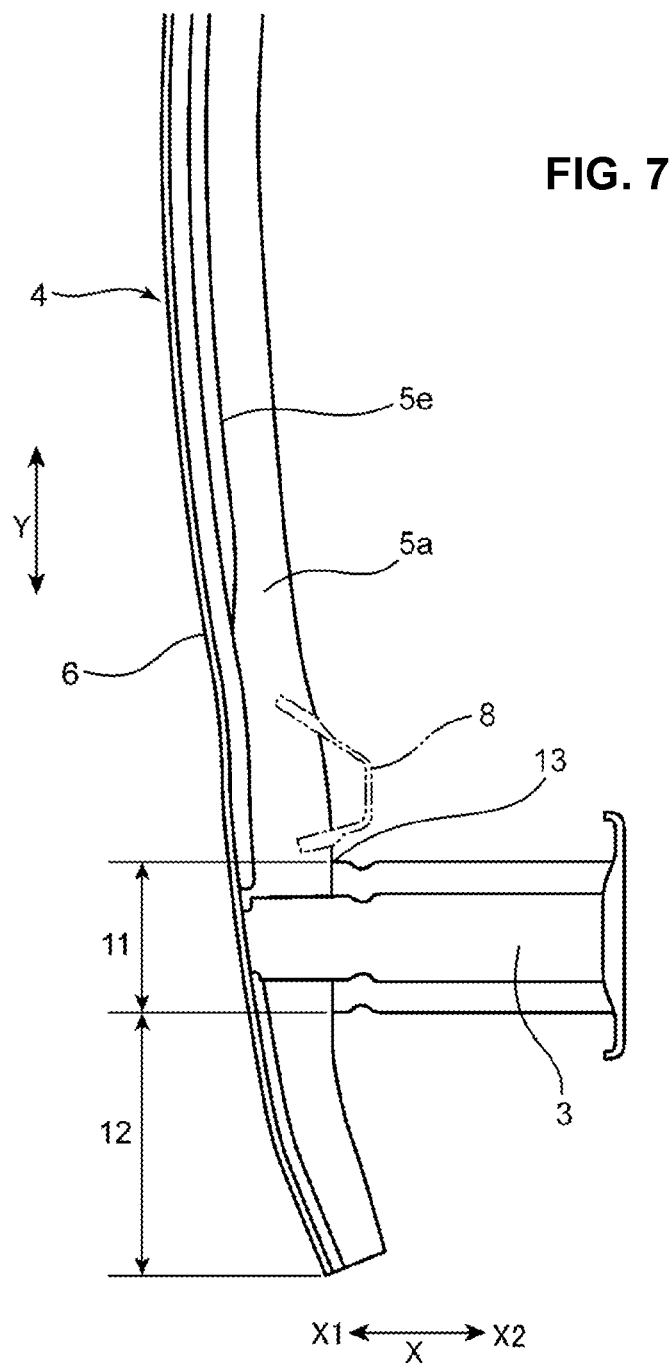
FIG. 7 is an enlarged plan view of an end portion of the bumper beam shown in FIG. 2 and a crash can.

Herein, reference character 8 shown in FIGS. 1 and 2 denotes a bracket to attach a shroud of a radiator. This bracket 8 is a component which does not contribute to reception of the collision load, and therefore this may be omitted.

The pair of front frames 2 are provided to be separated, in the vehicle width direction Y, from each other and extend in a vehicle longitudinal direction X. An attaching flange 9 to fix the crash can 3 is provided at a front end 2a of the front frame 2. Herein, a rear end of the front frame 2 is fixed to a vehicle-body structural component, not illustrated, such as a hinge pillar.

The pair of crash cans 3 are fixed to the respective front ends 2a of the pair of front frames 2 and extend in the vehicle longitudinal direction X.

The pair of crash cans 3 are fixed to positions which are separated, in the vehicle width direction Y, from each other at a rear end of the bumper beam 5. That is, a front end 3a of the crash can 3 of the present embodiment is fixed to the bumper beam 5 by welding or the like, and an attaching flange 10 is provided at its rear end 3b. The attaching flange 10 of the rear end 3b of the crash can 3 is provided to overlap with the attaching flange 9 of the front end 2a of the front frame 2 and these attaching flanges 9, 10 are connected by using a fastening tool, such as a bolt, whereby the crash can 3 is fixed to the front end 2a of the front frame 2.

As shown in FIGS. 2-4, 6, 7 and 16, the bumper beam 5 includes a crash-can fixation portion 11 which is fixed to the crash can 3 and an extension portion 12 which extends outwardly, in the vehicle width direction Y, from the crash-can fixation portion 11 at each side, in the vehicle width direction Y, thereof.

Figure 12:
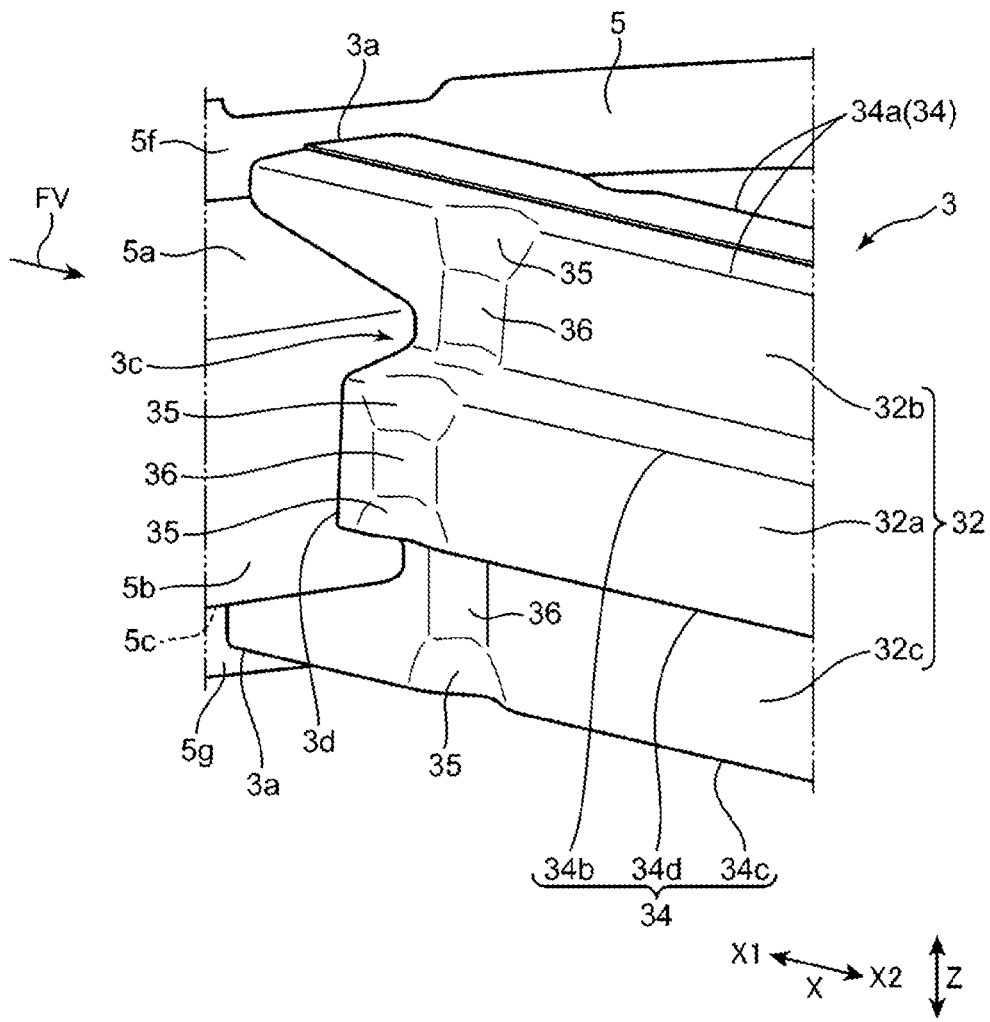
FIG. 12 is an enlarged perspective view of a joint portion of the crash can and the bumper beam which are shown in FIG. 4.
Figure 16:
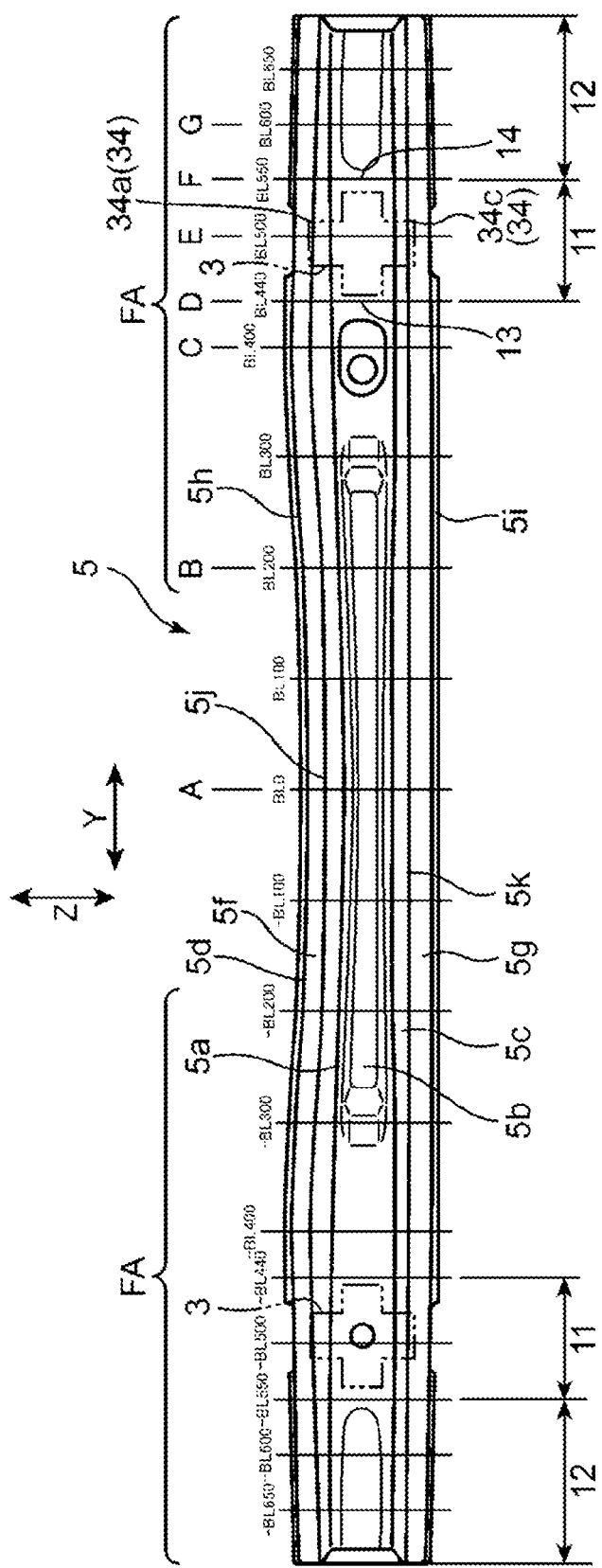
FIG. 16 is a view of the bumper beam shown in FIG. 6, when viewed from a rearward side.
Figure 18:
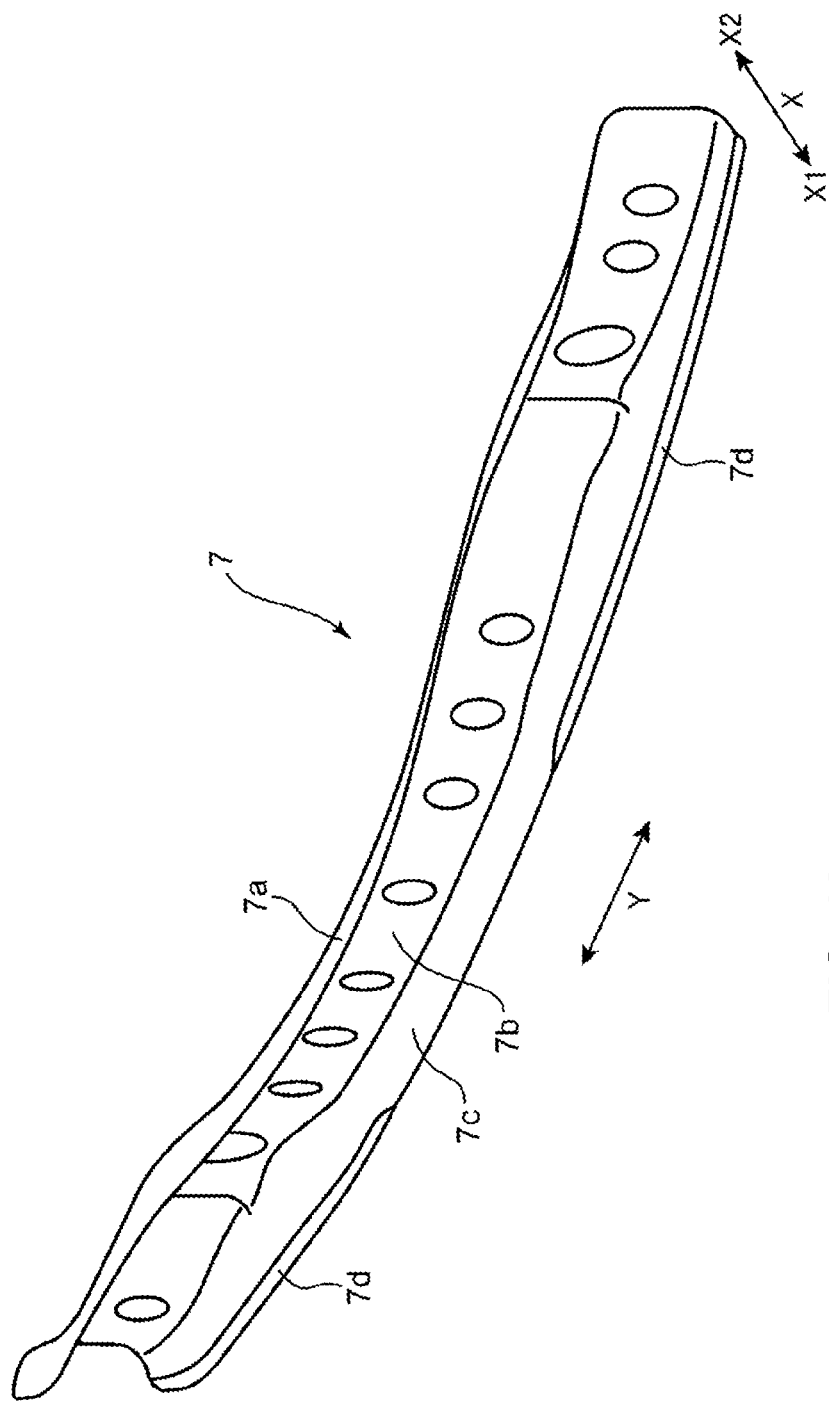
FIG. 18 is a perspective view of a reinforcing member shown in FIG. 3.

The bumper beam 5 further includes, as shown in FIGS. 12, 16 and 17, a pair of flange portions 5f, 5g which respectively protrude upwardly and downwardly and extend in the vehicle width direction Y.

Next, respective structures of the crash can 3 and the bumper 4 will be described specifically.

[Structure of Crash Can 3]

As shown in FIGS. 8-12, the crash can 3 has a cross-shaped cross section (see FIG. 11) in the vehicle elevational view (in an elevational view when viewed from the vehicle forward side X1 (i.e., in the elevational view of an arrow FV direction in FIG. 12)), which is a cylindrical member extending in the vehicle longitudinal direction X. This cylindrical member having the cross-shaped cross section is made by overlapping two split parts which are split in its longitudinal direction, for example. Each split part is made by pressing a metal plate, such as a steel or aluminum-alloy plate.

The crash can 3 primarily comprises an upper face portion 31, a lower face portion 33, a pair of side face portions 32, corner portions 34, first beads 35 as first fragile portions which are provided at the corner portions 34, and second beads 36 as second fragile portions. The second beads 36 are provided at other places than the corner portions 34, i.e., at at least one of the upper face portion 31, the lower face portion 33, and the pair of side face portions 32 (at the pair of side face portions 32 in the present embodiment).

The upper face portion 31 is a portion which extends in the vehicle longitudinal direction X and forms an upper face of the crash can 3 in the vehicle elevational view. Specifically, the upper face portion 31 includes a central upper face part 31a and a pair of side upper face parts 31b which are positioned below and on the both sides, in the vehicle width direction Y, of the central upper face part 31a.

The lower face portion 33 is a portion which extends in the vehicle longitudinal direction X and forms a lower face of the crash can 3 in the vehicle elevational view. Specifically, the lower face portion 33 includes a central lower face part 33a and a pair of side lower face parts 33b which are positioned above and on the both sides, in the vehicle width direction Y, of the central lower face part 33a.

The pair of side face portions 32 are portions which are spaced, in the vehicle width direction Y, apart from each other and respectively interconnect both end portions, in the vehicle width direction Y, of the upper face portion 31 and the lower face portion 33. Specifically, each of the pair of side face portions 32 comprises a central side face part 32a, an upper side face part 32b which is positioned above and on an inward side, in the vehicle width direction Y, of the central side face part 32a, and a lower side face part 32c which is positioned below and on the inward side, in the vehicle width direction Y, of the central side face part 32a.

The corner portions 34 are portions which are positioned between the side face portion 32 and the upper face portion 31 and between the side face portion 32 and the lower face portion 33, and respectively configured to be bent in an L shape (specifically, bent at a right angle). The corner portion 34 extends in the vehicle longitudinal direction X. The corner portion 34 has the higher rigidity than the other portion of the crash can 3 and the superior properties of the load transmission in the vehicle longitudinal direction because of its bent shape.

Specifically, the corner portion 34 comprises a central upper-side corner part 34a which is positioned between the upper side face part 32b and the central upper face part 31a, a side upper-side corner part 34b which is positioned between the central side face part 32a and the side upper face part 31b, a central lower-side corner part 34c which is positioned between the lower side face part 32c and the central lower face part 33a, and a side lower-side corner part 34d which is positioned between the central side face part 32a and the side lower face part 33b.

As shown in FIG. 12, a pair of central upper-side corner parts 34a which are positioned on an upper-face side of the crash can 3 and a pair of central lower-side corner parts 34c which are positioned on a lower-face side of the crash can 3 respectively extend up to positions where these parts 34a, 34c contact respective back faces of the pair of flange portions 5f, 5g protruding in the vertical direction Z of the bumper beam 5 which face toward a vehicle rearward side X2. In other words, each of the pair of central upper-side corner parts 34a and the pair of central lower-side corner parts 34c is configured to extend up to a foremost position, on the vehicle forward side X1, of a back face of the bumper beam 5 which faces rearwardly toward the vehicle rearward side X2.

The first bead 35 is configured such that the corner portion 34 of the crash can 3 is partially recessed. Thereby, the corner portion 34 tends to have stress concentration at a point of this first bead 35, so that the corner portion 34 is configured to be fragile. Specifically, the first bead 35 is provided at each of the central upper-side corner part 34a, the side upper-side corner part 34b, the central lower-side corner part 34c, and the side lower-side corner part 34d.

As shown in FIGS. 12 and 16, the central upper-side corner part 34a and the central lower-side corner part 34c are located at positions which respectively overlap with the pair of flange portions 5f, 5g of the bumper beam 5 in the vehicle elevational view (when viewed from the arrow FV direction in FIG. 12). Accordingly, in the vehicle collision, the collision load can be directly transmitted from the pair of flange portions 5f, 5g of the bumper beam 5 to the central upper-side corner part 34a and the central lower-side corner part 34c of the crash can 3.

Further, the side upper-side corner part 34b and the side lower-side corner part 34d are located at positions which respectively overlap with a rear face portion 5b of the bumper beam 5 which protrudes toward the vehicle rearward side X2 in the vehicle elevational view (when viewed from the arrow FV direction in FIG. 12). Accordingly, in the vehicle collision, the collision load can be directly transmitted from the rear face portion 5b of the bumper beam 5 to the side upper-side corner part 34b and the side lower-side corner part 34d of the crash can 3.

Figure 8:
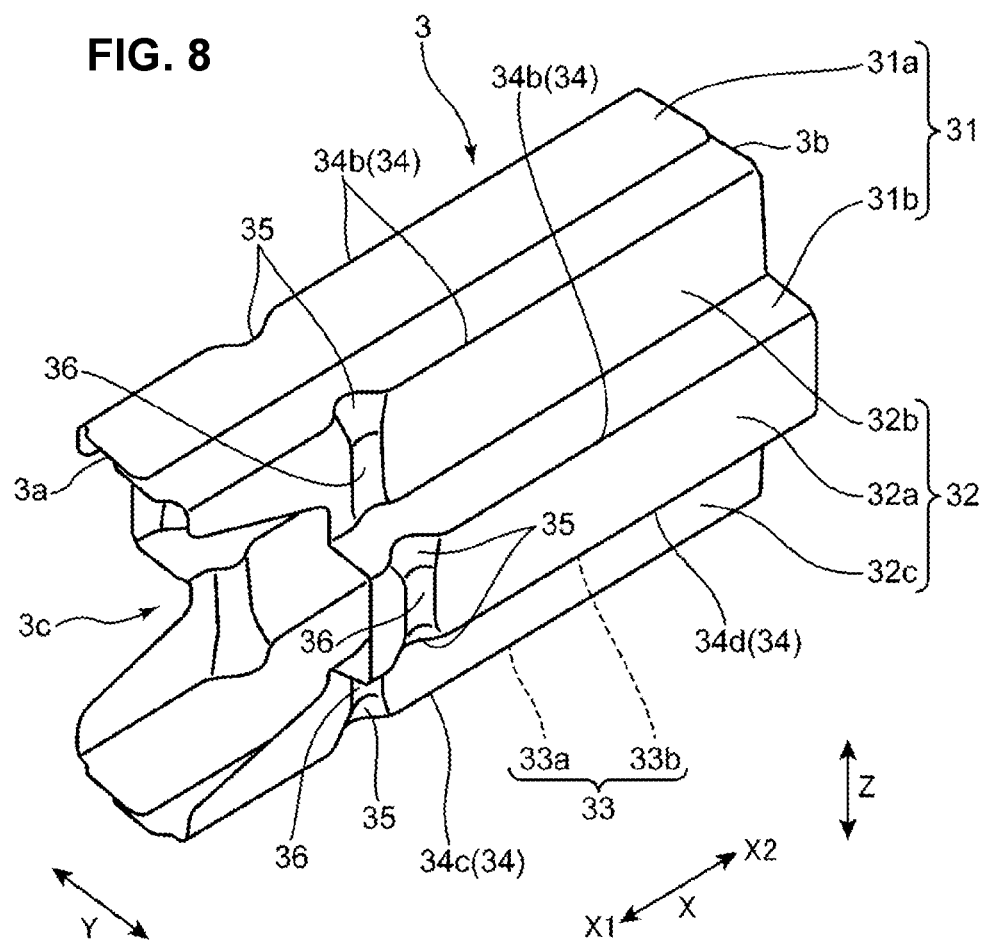
FIG. 8 is an enlarged perspective view of the crash can shown in FIG. 1.
Figure 9:
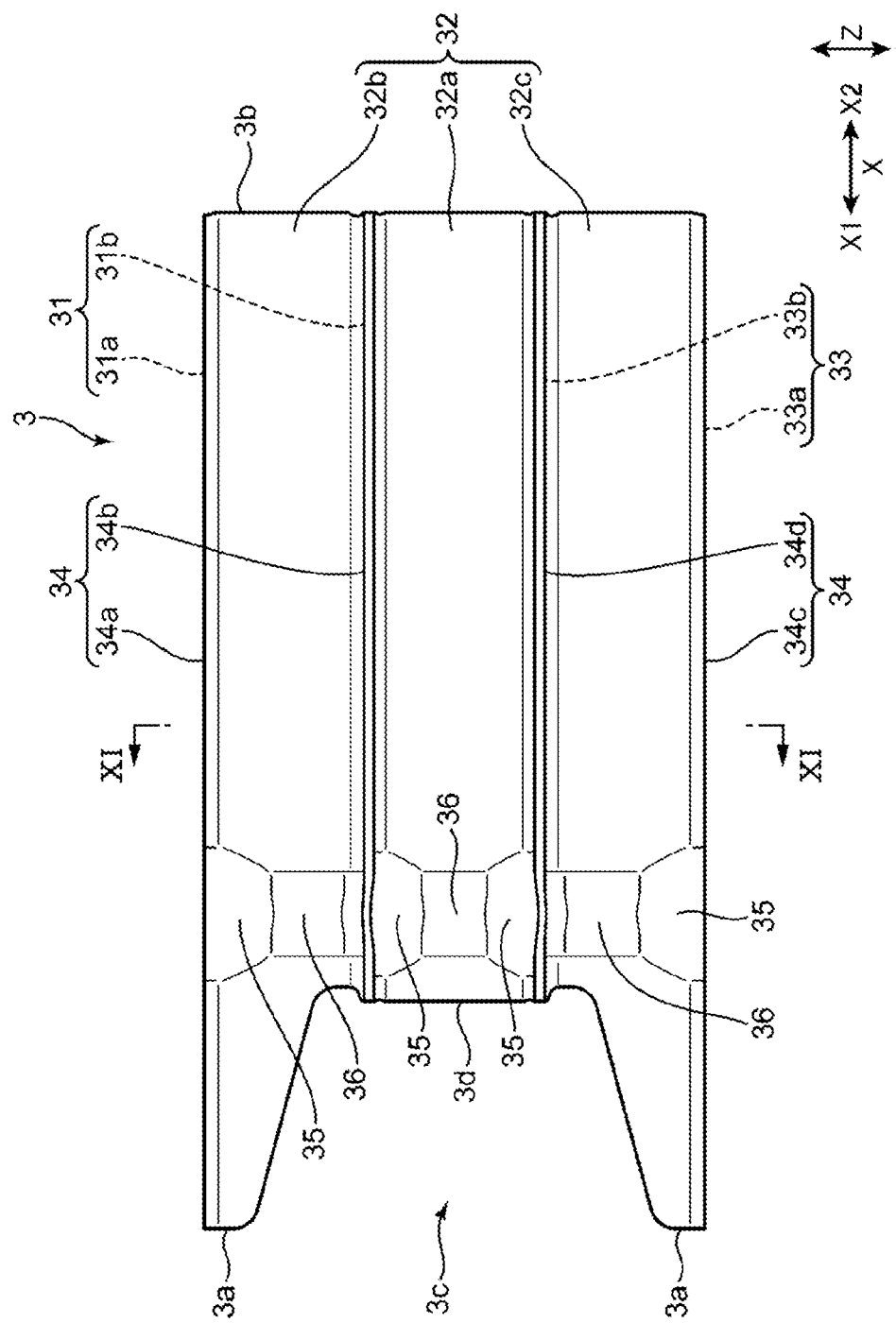
FIG. 9 is a side view of the crash can shown in FIG. 8.

In the present embodiment, as shown in FIGS. 8 and 12, a recess portion 3c with which the rear face portion 5b of the bumper beam 5 is engaged is formed at the front end 3a of the crash can 3. Therefore, as show in FIG. 12, the pair of flange portions 5f, 5g of the bumper beam 5 contact the front end 3a of the crash can 3 and thereby can transmit the collision load to the central upper-side corner part 34a and the central lower-side corner part 34c, and concurrently the rear face portion 5b of the bumper beam 5 contacts a back end 3d (see FIGS. 9 and 10) of the recess portion 3c of the crash can 3 and thereby can transmit the collision load to the side upper-side corner part 34b and the side lower-side corner part 34d.

The second bead 36 is configured such that at least one of the upper face portion 31, the lower face portion 33, and the pair of side face portions 32 of the crash can 3 (the pair of side face portions 32 in the present embodiment) is partially recessed. For example, the pair of side face portions 32 tend to have stress concentration at a point of this second bead 36, so that the side face portions 32 are configured to be fragile. Specifically, the second bead 36 is provided at each of the central side face part 32a, the upper side face part 32b, and the lower side face part 32c of the side face portion 32.

The second bead 36 is configured to extend in the vertical direction or in the vehicle width direction Y along at least one of the upper face portion 31, the lower face portion 32, and the side face portion 32.

In the present embodiment, the second beads 36 extend in the vertical direction Z along the central side face part 32a, the upper side face part 32b, and the lower side face part 32c of each of the both-side side face portions 32 such that those beads 36 are continuous from the first beads 35 which are respectively provided at the central upper-side corner part 34a, the side upper-side corner part 34b, the central lower-side corner part 34c, and the side lower-side corner part 34b along the central side face part 32a, the upper side face part 32b, and the lower side face part 32c of each of the both-side side face portions 32. That is, the second beads 36 are configured to extend downwardly from the first bead 35 of the central upper-side corner part 34a along the upper side face part 32b, extend downwardly toward the first bead 35 of the side lower-side corner part 34d from the first bead 35 of the side upper-side corner part 34b along the central side face part 32a, and extend upwardly from the first bead 35 of the central lower-side corner part 34c along the lower side face part 32c.

The first bead 35 is configured to be deformed before the second bead 36 when the collision load which is applied toward the vehicle rearward side X2 is inputted to the extension portion 12 (the end portion, in the vehicle width direction Y,) of the bumper beam 5. Specifically, as described later, a depth d1 and a width W1 of the first bead 35 are set to be respectively greater than a depth d2 and a width W2 of the second bead 36.

Figure 10:
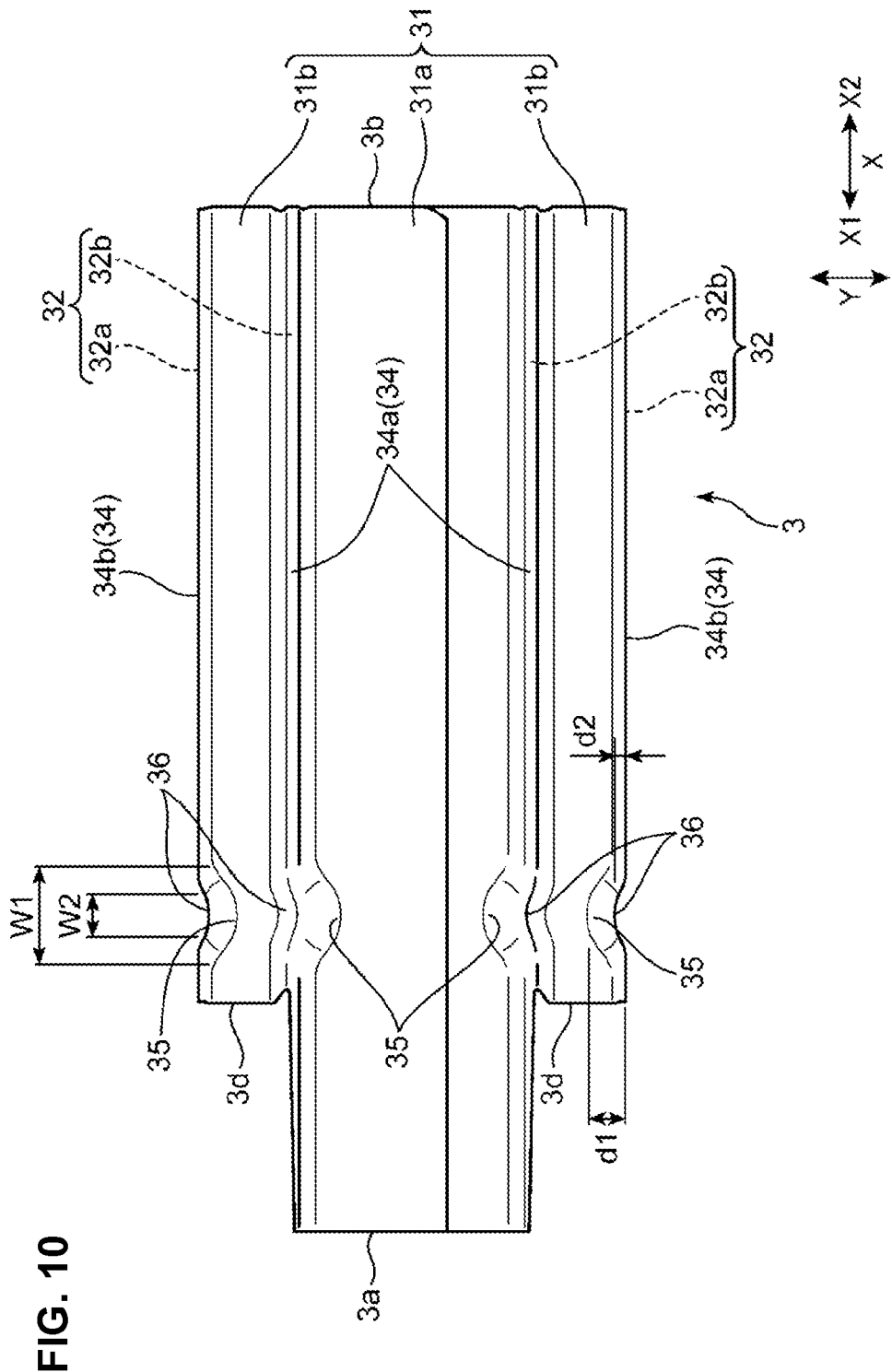
FIG. 10 is a plan view of the crash can shown in FIG. 8.
Figure 11:
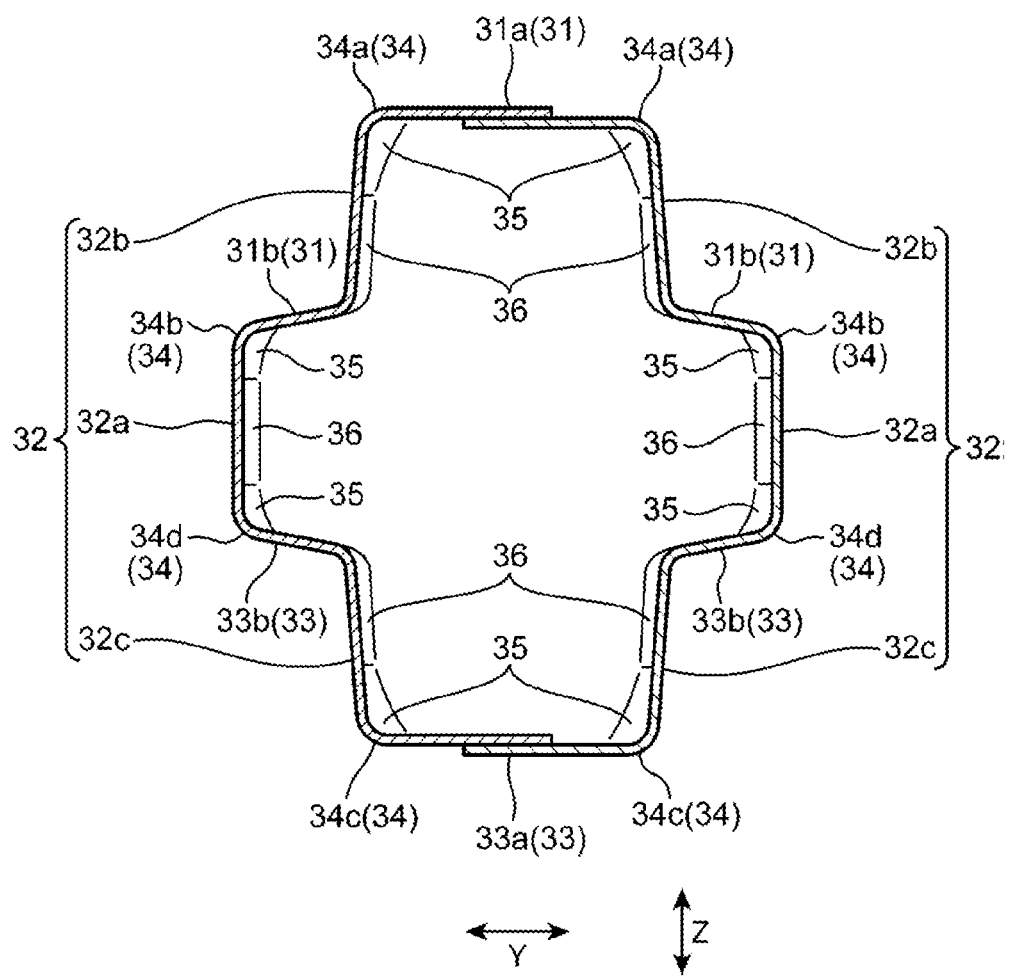
FIG. 11 is a sectional view taken along line XI-XI of the crash can shown in FIG. 9.

That is, in the present embodiment, as shown in FIG. 10, the depth d1 of the first bead 35 is greater than the depth d2 of the second bead 36. Further, the width W1, in the vehicle longitudinal direction X, of the first bead 35 is greater than the width W2, in the vehicle longitudinal direction X, of the second bead 36. Thereby, the first bead 35 which is provided at the corner portion 34 comes to be deformed before the second bead 36 which is provided at the other portion (a pair of side face portions 32 in the present embodiment) of the crash can 3 than the corner portion 34 in the vehicle collision.

A ratio of the depth d1 of the first bead 35 and the depth d2 of the second bead 36, i.e., d1:d2 is set to be about 1:2 through 1:3. Further, a ratio W1:W2 of the width W1, in the vehicle longitudinal direction X, of the first bead 35 and the width W2, in the vehicle longitudinal direction X, of the second bead 36 is set to be substantially the same as d1:d2.

Further, the second bead 36 is configured to be deformed before the front frame 2 when the collision load applied toward the vehicle rearward side X2 is inputted to the extension portion 12. Specifically, the depth d2 and the width W2 of the second bead 36 are set such that the crash can 3 is deformed at a point of the second bead 36 before the front frame 2 when the collision load applied toward the vehicle rearward side X2 is inputted to the extension portion 12 (that is, its rigidity is set such that the point of the second bead 36 is deformed before the front frame 2).

Figure 13:
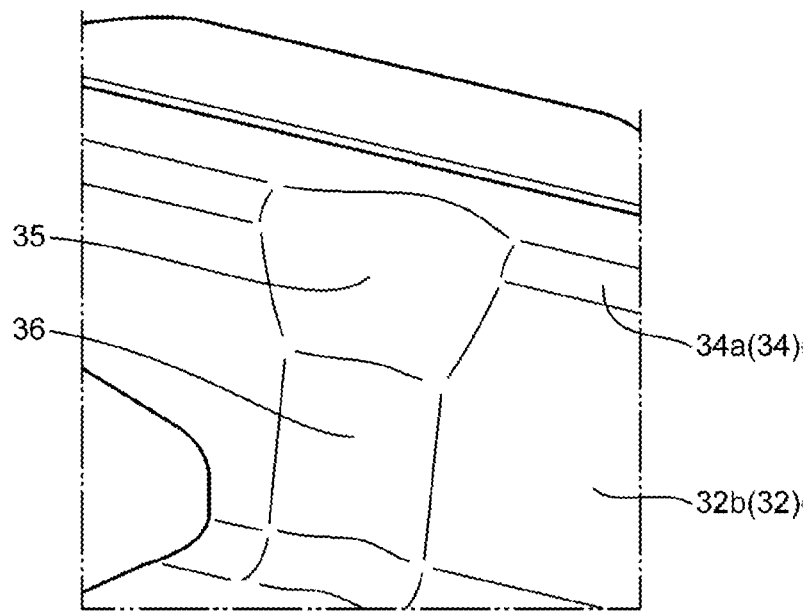
FIG. 13 is an enlarged perspective view of a first bead and a second bead which are shown in FIG. 12, wherein the first bead has an inner face which has a shape like a half-cut corn and the second bead is continuous to the first bead.

The shape of the first bead 35 provided at the corner portion 34 is not limited in the present disclosure, and the first bead 35 may be configured to have an inner face which has a shape like a half-cut corn as shown in FIG. 13, for example. In this case, the second bead 36 has the same width and depth as a lower end of the first bead 35 which has the smallest width and depth, and extends downwardly continuously from the lower end of the first bead 35.

Figure 14:
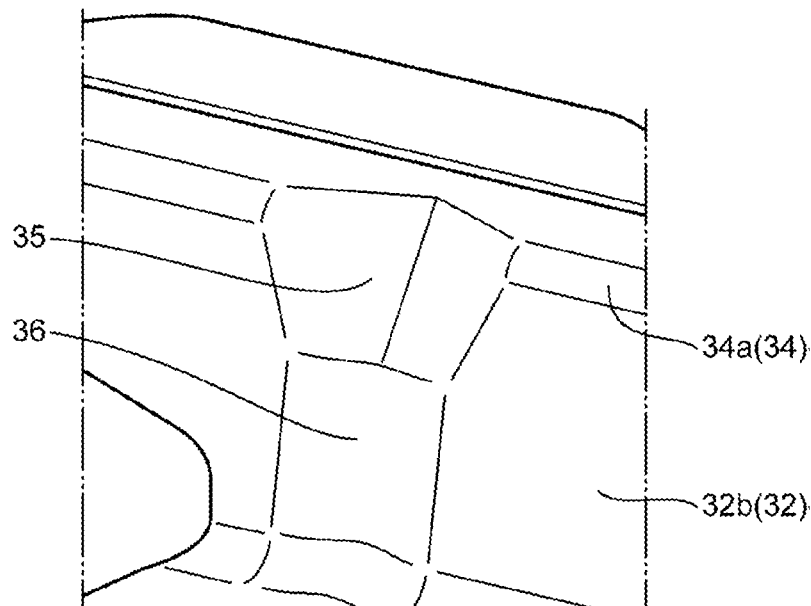
FIG. 14 is an enlarged perspective view of a first bead and a second bead according to a modification of the present disclosure, wherein the first bead has an inner face which has a shape like a half-cut pyramid and the second bead is continuous to the first bead.
Figure 15:
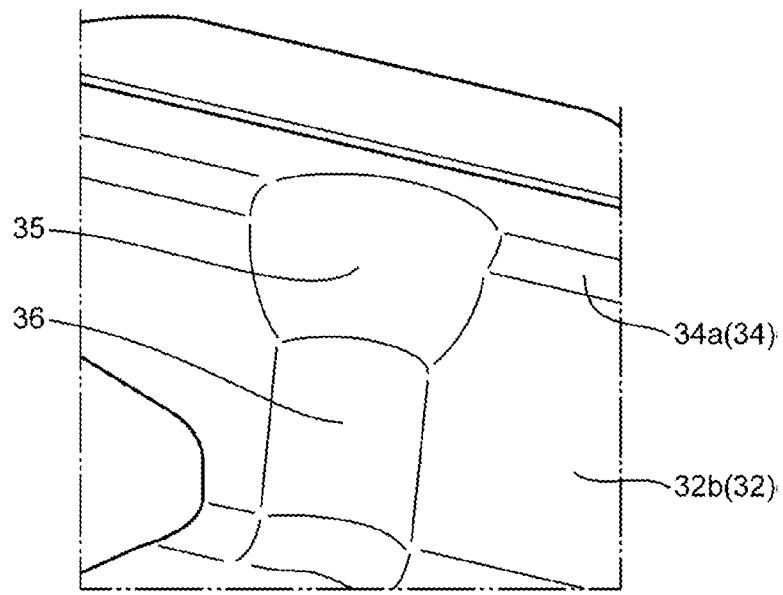
FIG. 15 is an enlarged perspective view of a first bead and a second bead according to another modification of the present disclosure, wherein the first bead has an inner face which has a shape like a half-cut sphere and the second bead is continuous to the first bead.

Herein, as shown in FIG. 14, the first bead 35 may be configured to have an inner face which has a shape like a half-cut pyramid. Further, the first bead 35 may be configured to have an inner face which has a shape like a half-cut sphere as shown in FIG. 15.

[Structure of Bumper 4]

Any structure may be applied to the bumper 4 as long as the bumper beam 5 is provided width the pair of flange portions 5f, 5g. Any structure may be applied to the other structural elements than the bumper beam 5.

The bumper 4 of the present embodiment, which is shown in FIGS. 1-7, 16 and 17 as an example, comprises the bumper beam 5 which is a body portion of the bumper 4, a front plate 6 which is attached to a portion of the bumper beam 5 which is positioned on the vehicle forward side X1, and a reinforcing member 7. The bumper beam 5, the front plate 6, and the reinforcing member 7 are respectively made of a metal plate, such as a steel plate.

The bumper beam 5 extends in the vehicle width direction Y and is fixed to the front ends 3a of the pair of crash cans 3 by welding or the like.

As shown in FIGS. 3-7 and 16, the bumper beam 5 is an elongated member extending in the vehicle width direction Y, a middle area, in the vertical direction Z, thereof protrudes toward the vehicle rearward side X2, and it has a U-shaped cross section opened toward the vehicle forward side X1 as shown in FIGS. 17A-17G.

More specifically, the bumper beam 5 comprises, as shown in FIGS. 16 and 17A-17G, a beam upper face portion 5a which extends in the vehicle longitudinal direction X, a beam rear face portion 5b which extends downwardly from a rear end of the beam upper face portion 5a, a beam lower face portion 5c which extends toward the vehicle forward side X1 from a lower end of the beam rear face portion 5b, an upper corner portion 5d which is formed by the beam upper face portion 5a and the beam rear face portion 5b, and a lower corner portion 5e which is formed by the beam lower face portion 5c and the beam rear face portion 5b in the vehicle side view.

Further, the bumper beam 5 further comprises the pair of flange portions 5f, 5g which form a front-end portion of the bumper beam 5 as described above (see FIGS. 12 and 16-17). The pair of flange portions 5f, 5g extend upwardly from a front end of the beam upper face portion 5a and extend downwardly from a front end of the beam lower face portion 5c. The bumper beam 5 having a hat-shaped cross section is formed by the beam upper face portion 5a, the beam rear face portion 5b, the beam lower face portion 5c, and the pair of flange portions 5f, 5g.

Further, as shown in FIGS. 6, 16 and 17A, 17B, step parts 5j, 5k which are configured to be bent in the vertical direction (i.e., parts bent in a step shape) and extend in the vehicle width direction Y are formed at least one of the beam upper face portion 5a and the beam lower face portion 5c (at the both in the present embodiment) of the bumper beam 5 of the present embodiment between both-side inward end portions 13, in the vehicle width direction Y, thereof. Specifically, the step part 5j which is bent downwardly for reinforcement of the beam upper face portion 5a is formed at the beam upper face portion 5a. The step part 5k which is bent upwardly for reinforcement of the beam lower face portion 5c is formed at the beam lower face portion 5c.

Further, as shown in FIGS. 2-4, 6, 7 and 16, the bumper beam 5 comprises the crash-can fixation portion 11 and the extension portion 12 at each of the both sides, in the vehicle width direction Y, thereof as described above.

As shown in FIGS. 1, 2 and 17-19, the front plate 6 is a plate member extending in the vehicle width direction Y, which covers the bumper beam 5 having the U-shaped cross section from the vehicle forward side X1 such that it forms a closed cross section together with the bumper beam 5.

The reinforcing member 7 is a member to reinforce the bumper beam 5 and provided inside a closed cross section 15 (see FIG. 17A) which extends in the vehicle width direction Y and is formed by the bumper beam 5 and the front plate 6.

The reinforcing member 7 is configured to extend in the vehicle width direction and have a U-shaped cross section similarly to the bumper beam 5.

Specifically, the reinforcing member 7 comprises, as shown in FIGS. 17A-17G and 18, a reinforcing-member upper face portion 7a, a reinforcing-member rear face portion 7b which extends downwardly from a rear end of the reinforcing-member upper face portion 7a, and a reinforcing-member lower face portion 7c which extends toward the vehicle forward side X1 from a lower end of the reinforcing-member rear face portion 7b.

The reinforcing-member upper face portion 7a is joined to the beam upper face 5a at a joint portion 21 by welding or the like. The reinforcing-member rear face portion 7b is joined to the beam rear face 5b at a joint portion 22 by welding or the like. Meanwhile, the reinforcing-member lower face portion 7c is arranged above the beam lower face portion 5c in a state where this portion 7c is not joined to the beam lower face portion 5c.

In the front vehicle-body structure of the vehicle of the present embodiment, as shown in FIGS. 17B-17G and 18, the reinforcing-member lower face portion 7c has the flange portion 7d which is configured such that a front end part of the reinforcing-member lower face portion 7c is bent downwardly. The reinforcing-member lower face portion 7c is reinforced by this flange portion 7d, so that out-of-plane deformation of the reinforcing member 7 in the vehicle collision is suppressed and thereby a two-plate structure which comprises the beam lower face portion 5c and the reinforcing-member rear face portion 7c is formed simulatively. Moreover, out-of-plane deformation of the bumper beam 5 which is joined to two faces of the reinforcing-member upper face portion 7a and the reinforcing-member rear face portion 7b is suppressed as well. Thereby, deformation of the lower corner portion 5e which is formed by the beam lower face portion 5c and the beam rear face portion 5b in the vehicle collision is suppressed, so that out-of-plane deformation of the beam rear face portion 5d is possibly suppressed. Consequently, even in a structure where the bumper beam 5 and the reinforcing member 7 are not joined partially (i.e., the beam lower face portion 5c and the reinforcing-member lower face portion 7c are not joined), the out-of-plane deformation of the bumper beam 5 is so suppressed that this structure can bear the collision load properly.

A shown in FIGS. 17B-17G, the flange portion 7d is located at the same level as or a lower level than the lower corner portion 5e. Thereby, when the bumper beam 5 is deformed in the vehicle longitudinal direction X in the vehicle frontal collision, the flange portion 7d of the reinforcing member 7 possibly comes to contact the beam lower face portion 5c of the bumper beam 5, so that the reinforcing-member lower face portion 7c forms the two-plate structure together with the beam lower face portion 5c which is simulatively joined thereto. Accordingly, the deformation of the lower corner portion 5e is so securely suppressed by reinforcing the lower corner portion 5e of the bumper beam 5 that the out-of-plane deformation of the beam rear face portion 5b can be suppressed properly. Consequently, bending deformation of the bumper beam 5 in the vehicle collision can be suppressed securely.

The flange portion 7d extends from the end portion, in the vehicle width direction Y, of the reinforcing member 7 to a position which corresponds to the inward end portion 13, in the vehicle width direction Y, of the crash-can fixation portion 11 (see FIGS. 4, 7 and 16) or a position which is located on the central side, in the vehicle width direction Y, of this corresponding position. Specifically, the flange portion 7d shown in FIG. 18 extends over an area FA from a position B to the end portion of the bumper beam 5 (see FIG. 16).

Further, as shown in FIGS. 17B-17G, the flange portion 7d is configured such that an angle thereof which is bent downwardly becomes continuously smaller as it goes to the center of the bumper beam 5, thereby lowering a rigidity difference, in the vehicle width direction Y, of the reinforcing-member lower face portion 7c.

Further, in order to reinforce a portion of the bumper beam 5 which is positioned on the vehicle forward side X1 (i.e., the pair of flange portions 5f, 5g, a front end of the beam upper face portion 5a, and a front end of the beam lower face portion 5c), the bumper beam 5 of the present embodiment further comprises, as shown in FIGS. 16 and 17A-17G, an upper-end bent flange portion 5h which is configured such that an upper end of the upper flange portion 5f is bent rearwardly and a lower-end bent flange portion 5i which is configured such that a lower end of the lower flange portion 5g is bent rearwardly in the area FA where the flange portion 7d of the reinforcing member 7 is provided (see FIG. 16). While the upper-end bent flange portion 5h and the lower-end bent flange portion 5i are provided over a nearly entire length of the bumper beam 5 as shown in FIG. 16 in the present embodiment, the present disclosure is not limited to this, and these portions 5h, 5i may be provided in the area FA where at least the flange portion 7d of the reinforcing member 7 is provided. Herein, while there is an area where the upper-end bent flange portion 5h and the lower-end bent flange portion 5i are not provided in the area of the crash-can fixation portion 11 of the bumper beam 5 in order to avoid any interference with the crash can 3 as shown in FIG. 16, these portions 5h, 5i may be provided at an entire area of the crash-can fixation portion 11 as long as such interference can be avoided by changing a size or the like of the crash can 3.

[Features of Present Embodiment]

The front vehicle-body structure 1 of the vehicle of the present disclosure comprises the pair of front frames 2 provided to be separated, in a vehicle width direction Y, from each other and extending in the vehicle longitudinal direction X, the pair of crash cans 3 fixed to the respective front ends of the pair of front frames 2 and extending in the vehicle longitudinal direction X, and the bumper beam 5 fixed to the respective front ends of the pair of crash cans 3 and extending in the vehicle width direction Y. The bumper beam 5 comprises the crash-can fixation portions 11 which are respectively fixed to the pair of crash cans 3 and the extension portions 12 which respectively extend outwardly, in the vehicle width direction Y, from the crash-can fixation portions 11. Each of the pair of crash cans 3 comprises the upper face portion 31 which extends in the vehicle longitudinal direction X and forms the upper face of the crash can 3 in the vehicle elevational view (when viewed from the arrow FV direction in FIG. 12), the lower face portion 33 which extends in the vehicle longitudinal direction X and forms the lower face of the crash can 3 in the vehicle elevational view (when viewed from the arrow FV direction in FIG. 12), the pair of side face portions 32 which respectively interconnect the both end portions, in the vehicle width direction Y, of the upper face portion 31 and the lower face portion 33, the corner portions 34 which are respectively positioned between the side face portion 32 and the upper face portion 31 and between the side face portion 32 and the lower face portion 33, the first bead 35 as the first fragile portion which is provided at each of the corner portions 34, and the second bead 36 as the second fragile portion which is provided at at least one of the upper face portion 31, the lower face portion 33, and the pair of side face portions 32 (at the pair of side face portions 32 in the present embodiment).

The first bead 35 is configured to be deformed before the second bead 36 when the collision load which is applied toward the vehicle rearward side X2 is inputted to the extension portion 12 of the bumper beam 5. The second bead 36 is configured to be deformed before the front frame 2 when the collision load applied toward the vehicle rearward side X2 is inputted to the extension portion 12 of the bumper beam 5.

According to this structure, since the first bead 35 provided at the corner portion 34 of the crash can 3 is deformed and absorbs the collision energy first by the initial collision load transmitted by way of the corner portion 34 when the collision load applied toward the vehicle rearward side X2 is inputted to the extension portion 12 positioned at the end portion, in the vehicle width direction Y, of the bumper beam 5 (i.e., in the small overlap collision), the transmission quantity of the collision load from the crash can 3 to the front frame 2 can be suppressed. Further, since the second bead 36 provided at at least one of the upper face portion 31, the lower face portion 33, and the pair of side face portions 32 is configured not to be deformed before the first bead 35 (at the pair of side face portions 32 in the present embodiment), the collision energy can be properly absorbed by whole-part deformation of the first bead 35 and the second bead 36, maintaining the high transmission quantity of the collision load, compared to a case where the second bead 36 is configured to have the same deformability as the first bead 35. Consequently, the suppression of the transmission quantity of the initial collision load to the front frame 2 in the vehicle collision and the securement of the energy-absorption quantity during the deformation of the crash can 3 can be compatibly attained.

Herein, it is unnecessary that the second bead 36 extends in the vertical direction Z or in the vehicle width direction Y continuously from the first bead 35 (for example, in a case where the second bead 36 is provided to be offset, in the vehicle longitudinal direction X, from the first bead 35). In this case, the above-described operational effects can be provided as well.

In the front vehicle-body structure 1 of the vehicle of the present embodiment, the second bead 36 extends continuously from the first bead 35 in the vehicle width direction Y or in the vertical direction Z (in the vertical direction Z in the present embodiment) along at least one of the upper face portion 31, the lower face portion 33, and the side face portions 32 (at the side face portions 32 in the present embodiment).

According to this structure, the collision load is smoothly transmitted to the second bead 36 extending in the vehicle width direction Y or in the vertical direction Z continuously from the first bead 35 subsequently to the deformation of the first bead 35 which is conducted first by the initial collision in the vehicle collision, thereby enabling continuous deformation of the first bed 35 and the second bead 36, so that the whole-part deformation of the first bead 35 and the second bead 36 can be securely attained, maintaining the high transmission quantity of the collision load, and consequently the collision energy can be properly absorbed. Thus, the suppression of the transmission quantity of the initial collision load to the front frame 2 in the vehicle collision and the securement of the energy-absorption quantity during the deformation of the crash can 3 can be compatibly attained.

Herein, the second bead 36 may be configured to extend in the vehicle width direction Y continuously from the first bead 35 along the upper face portion 31 and the lower face portion 33 of the crash can 3. In this case, the above-described operational effects can be provided as well.

In the front vehicle-body structure 1 of the vehicle of the present embodiment, the first bead 35 is made of a bead which is configured such that the corner portion 34 of the crash can 3 is partially recessed (i.e., is configured to be fragile). The second bead 36 is made of a bead which is configured such that at least one of the upper face portion 31, the lower face portion 33, and the pair of side face portions 32 of the crash can 3 is partially recessed.

As shown in FIG. 10, the depth d1 of the first bead 35 is greater than the depth d2 of the second bead 36, and the width W1, in the vehicle longitudinal direction X, of the first bead 35 is greater than the width W2 of the second bead 36.

According to this structure, the above-described compatibility of the suppression of the transmission quantity of the initial collision load to the front frame 2 in the vehicle collision and the securement of the energy-absorption quantity during the deformation of the crash can 3 is enabled by the first bead 35 and the second bead 36 which have the different depth d1, d2 and width W1, W2 from each other.

That is, since the first bead 35 provided at the corner portion 34 of the crash can 3 is deformed and absorbs the collision energy first by the initial collision load in the small-overlap collision, the transmission quantity of the collision load from the crash can 3 to the front frame 2 can be suppressed. Meanwhile, since the second bead 36 (the depth d2, the width W2) provided at at least one of the upper face portion 31, the lower face portion 33, and the pair of side face portions 32 of the crash can 3 (at the side face portions 32 in the present embodiment) has the smaller depth and width than the first bead 35 (the depth d1, the width W1), the second bead 36 is configured not to be more easily deformable than the first bead 35. Accordingly, the collision energy can be properly absorbed by the deformation of the second bead 36, maintaining the high transmission quantity of the collision load. Consequently, the suppression of the transmission quantity of the initial collision load to the front frame 2 in the vehicle collision and the securement of the energy-absorption quantity during the deformation of the crash can 3 can be compatibly attained securely.

In the front vehicle-body structure 1 of the vehicle of the present embodiment, as shown in FIG. 12, the corner portion 34 positioned on the upper-face side of the crash can 3 (specifically, the pair of central upper-side corner parts 34a) and the corner portion 34 positioned on the lower-face side of the crash can 3 (specifically, the pair of central lower-side corner parts 34c) respectively extend up to the foremost position, in the vehicle longitudinal direction X, of the back face of the bumper beam 5 which faces rearwardly.

According to this structure, the collision load inputted to the crash can 3 from the bumper beam 5 in the vehicle collision can be transmitted directly to the corner portions 34, which are respectively positioned on the upper-face side and the lower-face side of the crash can 3 at the foremost position, in the vehicle longitudinal direction X, of the back face of the bumper beam 5 which faces rearwardly. Consequently, the suppression of the transmission quantity of the initial collision load to the front frame 2 in the vehicle collision and the securement of the energy-absorption quantity during the deformation of the crash can 3 can be compatibly attained securely.

In the front vehicle-body structure 1 of the vehicle of the present embodiment, the crash can 3 is configured to have the cross-shaped cross section in the vehicle elevational view.

The side face portion 32 comprises the central side face part 32a, the upper side face part 32b which is positioned on the upper-and-inward side, in the vehicle width direction Y, of the central side face part 32a, and the lower side face part 32c which is positioned on the lower-and-inward side, in the vehicle width direction, of the central side face part 32a. The upper face portion 31 comprises the central upper side part 31a and the pair of side upper face parts 31b which are positioned on the lower-and-both sides, in the vehicle width direction Y, of the central upper side part 31a. The lower face portion 33 comprises the central lower side part 33a and the pair of side lower face parts 33b which are positioned on the upper-and-both sides, in the vehicle width direction Y, of the central lower side part 33a.

The corner portion 34 comprised the central upper-side corner part 34a which is positioned between the upper side face part 32b and the central upper face part 31a, the side upper-side corner part 34b which is positioned between the central side face part 32a and the side upper face part 31b, the central lower-side corner part 34c which is positioned between the lower side face part 32 and the central lower face part 33a, and the side lower-side corner part 34d which is positioned between the central side face part 32a and the side lower face part 33b.

The first bead 35 is provided at each of the central upper-side corner part 34a, the side upper-side corner part 34b, the central lower-side corner part 34c, and the side lower-side corner part 34d.

The second bead 36 is provided at each of the central side face part 32a, the side upper side face 32b, and the side lower side face part 32c.

According to this structure, since the first beads 35 are provided at all of the corner portions 34 of the crash can 3, i.e., at the central upper-side corner part 34a, the side upper-side corner part 34b, the central lower-side corner part 34c, and the side lower-side corner part 34d, even in a manner that the crash can 3 is configured to have the cross-shaped cross section in the vehicle elevational view, the first beads 35 provided at the corner portions 34 of the crash can 3 are deformed and absorb the collision energy first by the initial collision load transmitted by way of these corner portions 34 in the vehicle collision, so that the transmission quantity of the collision load from the crash can 3 to the front frame 2 can be suppressed. Meanwhile, the second beads 36 which are configured not to be more easily deformable than the first beads 35 are provided at the plural parts which constitute the side-face portions 32 of the crash can 3, i.e., at the central side face part 32a, the side upper side face 32b, and the side lower side face part 32c, the collision energy can be properly absorbed by the whole-part deformation of the first beads 35 and the second beads 36, maintaining the high transmission quantity of the collision load. Consequently, even if the crash can 3 having the cross-shaped cross section is used, the suppression of the transmission quantity of the initial collision load to the front frame 2 in the vehicle collision and the securement of the energy-absorption quantity during the deformation of the crash can 3 can be compatibly attained securely.

In the front vehicle-body structure 1 of the vehicle of the present embodiment, as shown in FIGS. 12 and 16, the bumper beam 5 comprises the pair of flange portions 5f, 5g which protrude upwardly and downwardly and extend in the vehicle width direction Y. The corner portions 34 where the first beads 35 are provided (specifically, the pair of central upper-side corner portions 34a positioned on the upper-face side of the crash can 3 and the pair of central lower-side corner portions 34c positioned on the lower-face side of the crash can 3) are located at the positions which respectively overlap with the pair of flange portions 5f, 5g in the vehicle elevational view (when viewed from the arrow FV direction in FIG. 12).

According to this structure, the corner portion 34 provided with the first bead 35 can receive the collision load which is inputted from the bumper beam 5 to the crash can 3 from the vehicle forward side directly from the pair of flange portions 5f, 5g of the bumper beam 5. Therefore, the initial load can be securely transmitted to the corner portions 34 in the vehicle collision, so that the collision energy can be absorbed properly by making the first bead 35 provided at the corner portions 34 be deformed early.

[Modifications]

While the first fragile portion and the second fragile portion are made of the beads which are respectively configured such that the corner portion of the crash can and the other portion than the corner portion are recessed in the above-described embodiment, the present disclosure is not limited to this. The first fragile portion and the second fragile portion of the present disclosure may be respectively made of a thin portion which is configured such that the thick of the cylindrical crash can is made partially thin. That is, the first fragile portion may be configured such that the corner portion is partially thin, and the second fragile portion may be configured such that the other portion than the corner portion is partially thin.

What is claimed is:

1. A front vehicle-body structure of a vehicle, comprising:
a pair of front frames provided to be separated, in a vehicle width direction, from each other and extending in a vehicle longitudinal direction;
a pair of crash cans fixed to respective front ends of the pair of front frames and extending in the vehicle longitudinal direction; and
a bumper beam fixed to respective front ends of the pair of crash cans and extending in the vehicle width direction,
wherein said bumper beam comprises crash-can fixation portions which are respectively fixed to said pair of crash cans and extension portions which respectively extend outwardly, in the vehicle width direction, from said crash-can fixation portions,
each of said pair of crash cans comprises an upper face portion which extends in the vehicle longitudinal direction and forms an upper face of the crash can in a vehicle elevational view, a lower face portion which extends in the vehicle longitudinal direction and forms a lower face of the crash can in the vehicle elevational view, a pair of side face portions which respectively interconnect both end portions, in the vehicle width direction, of the upper face portion and the lower face portion, corner portions which are respectively positioned between the side face portion and the upper face portion and between the side face portion and the lower face portion, a first fragile portion which is provided at each of the corner portions, and a second fragile portion which is provided at at least one of the upper face portion, the lower face portion, and the pair of side face portions,
said first fragile portion is configured to be deformed before said second fragile portion when a collision load which is applied toward a vehicle rearward side is inputted to said extension portion of the bumper beam, and
said second fragile portion is configured to be deformed before said front frame when the collision load applied toward the vehicle rearward side is inputted to the extension portion of the bumper beam.

2. The front vehicle-body structure of the vehicle of claim 1, wherein said second fragile portion extends continuously from said first fragile portion in the vehicle width direction or in a vertical direction along at least one of said upper face portion, said lower face portion, and said side face portions.

3. The front vehicle-body structure of the vehicle of claim 2, wherein said first fragile portion is made of a first bead which is configured such that said corner portion of the crash can is partially recessed, said second fragile portion is made of a second bead which is configured such that said at least one of the upper face portion, the lower face portion, and the pair of side face portions of the crash can is partially recessed, a depth of said first bead is greater than that of said second bead, and a width, in the vehicle longitudinal direction, of said first bead is greater than that of said second bead.

4. The front vehicle-body structure of the vehicle of claim 3, wherein said corner portion positioned on an upper-face side of the crash can and said corner portion positioned on a lower-face side of the crash can are respectively configured to extend up to a foremost position, in the vehicle longitudinal direction, of a back face of said bumper beam which faces rearwardly.

5. The front vehicle-body structure of the vehicle of claim 4, wherein said crash can is configured to have a cross-shaped cross section in the vehicle elevational view, each of said side face portions comprises a central side face part, an upper side face part which is positioned on an upper-and-inward side, in the vehicle width direction, of the central side face part, and a lower side face part which is positioned on a lower-and-inward side, in the vehicle width direction, of the central side face part, said upper face portion comprises a central upper side part and a pair of side upper face parts which are positioned on lower-and-both sides, in the vehicle width direction, of the central upper side part, said lower face portion comprises a central lower side part and a pair of side lower face parts which are positioned on upper-and-both sides, in the vehicle width direction, of the central lower side part, said corner portion comprises a central upper-side corner part which is positioned between said upper side face part and said central upper face part, a side upper-side corner part which is positioned between said central side face part and said side upper face part, a central lower-side corner part which is positioned between said lower side face part and said central lower face part, and a side lower-side corner part which is positioned between said central side face part and said side lower face part, said first fragile portion is provided at each of said central upper-side corner part, said side upper-side corner part, said central lower-side corner part, and said side lower-side corner part, and said second fragile portion is provided at each of said central side face part, said side upper side face, and said side lower side face part.

6. The front vehicle-body structure of the vehicle of claim 5, wherein said bumper beam comprises a pair of flange portions which protrude upwardly and downwardly and extend in the vehicle width direction, and said corner portions where said first fragile portions are provided are located at positions which respectively overlap with said pair of flange portions in the vehicle elevational view.

7. The front vehicle-body structure of the vehicle of claim 1, wherein said first fragile portion is made of a first bead which is configured such that said corner portion of the crash can is partially recessed, said second fragile portion is made of a second bead which is configured such that said at least one of the upper face portion, the lower face portion, and the pair of side face portions of the crash can is partially recessed, a depth of said first bead is greater than that of said second bead, and a width, in the vehicle longitudinal direction, of said first bead is greater than that of said second bead.

8. The front vehicle-body structure of the vehicle of claim 1, wherein said corner portion positioned on an upper-face side of the crash can and said corner portion positioned on a lower-face side of the crash can are respectively configured to extend up to a foremost position, in the vehicle longitudinal direction, of a back face of said bumper beam which faces rearwardly.

9. The front vehicle-body structure of the vehicle of claim 1, wherein said crash can is configured to have a cross-shaped cross section in the vehicle elevational view, each of said side face portions comprises a central side face part, an upper side face part which is positioned on an upper-and-inward side, in the vehicle width direction, of the central side face part, and a lower side face part which is positioned on a lower-and-inward side, in the vehicle width direction, of the central side face part, said upper face portion comprises a central upper side part and a pair of side upper face parts which are positioned on lower-and-both sides, in the vehicle width direction, of the central upper side part, said lower face portion comprises a central lower side part and a pair of side lower face parts which are positioned on upper-and-both sides, in the vehicle width direction, of the central lower side part, said corner portion comprises a central upper-side corner part which is positioned between said upper side face part and said central upper face part, a side upper-side corner part which is positioned between said central side face part and said side upper face part, a central lower-side corner part which is positioned between said lower side face part and said central lower face part, and a side lower-side corner part which is positioned between said central side face part and said side lower face part, said first fragile portion is provided at each of said central upper-side corner part, said side upper-side corner part, said central lower-side corner part, and said side lower-side corner part, and said second fragile portion is provided at each of said central side face part, said side upper side face, and said side lower side face part.

10. The front vehicle-body structure of the vehicle of claim 1, wherein said bumper beam comprises a pair of flange portions which protrude upwardly and downwardly and extend in the vehicle width direction, and said corner portions where said first fragile portions are provided are located at positions which respectively overlap with said pair of flange portions in the vehicle elevational view.

11. The front vehicle-body structure of the vehicle of claim 2, wherein said corner portion positioned on an upper-face side of the crash can and said corner portion positioned on a lower-face side of the crash can are respectively configured to extend up to a foremost position, in the vehicle longitudinal direction, of a back face of said bumper beam which faces rearwardly.

12. The front vehicle-body structure of the vehicle of claim 5, wherein said crash can is configured to have a cross-shaped cross section in the vehicle elevational view, each of said side face portions comprises a central side face part, an upper side face part which is positioned on an upper-and-inward side, in the vehicle width direction, of the central side face part, and a lower side face part which is positioned on a lower-and-inward side, in the vehicle width direction, of the central side face part, said upper face portion comprises a central upper side part and a pair of side upper face parts which are positioned on lower-and-both sides, in the vehicle width direction, of the central upper side part, said lower face portion comprises a central lower side part and a pair of side lower face parts which are positioned on upper-and-both sides, in the vehicle width direction, of the central lower side part, said corner portion comprises a central upper-side corner part which is positioned between said upper side face part and said central upper face part, a side upper-side corner part which is positioned between said central side face part and said side upper face part, a central lower-side corner part which is positioned between said lower side face part and said central lower face part, and a side lower-side corner part which is positioned between said central side face part and said side lower face part, said first fragile portion is provided at each of said central upper-side corner part, said side upper-side corner part, said central lower-side corner part, and said side lower-side corner part, and said second fragile portion is provided at each of said central side face part, said side upper side face, and said side lower side face part.

13. The front vehicle-body structure of the vehicle of claim 2, wherein said bumper beam comprises a pair of flange portions which protrude upwardly and downwardly and extend in the vehicle width direction, and said corner portions where said first fragile portions are provided are located at positions which respectively overlap with said pair of flange portions in the vehicle elevational view.

14. The front vehicle-body structure of the vehicle of claim 3, wherein said crash can is configured to have a cross-shaped cross section in the vehicle elevational view, each of said side face portions comprises a central side face part, an upper side face part which is positioned on an upper-and-inward side, in the vehicle width direction, of the central side face part, and a lower side face part which is positioned on a lower-and-inward side, in the vehicle width direction, of the central side face part, said upper face portion comprises a central upper side part and a pair of side upper face parts which are positioned on lower-and-both sides, in the vehicle width direction, of the central upper side part, said lower face portion comprises a central lower side part and a pair of side lower face parts which are positioned on upper-and-both sides, in the vehicle width direction, of the central lower side part, said corner portion comprises a central upper-side corner part which is positioned between said upper side face part and said central upper face part, a side upper-side corner part which is positioned between said central side face part and said side upper face part, a central lower-side corner part which is positioned between said lower side face part and said central lower face part, and a side lower-side corner part which is positioned between said central side face part and said side lower face part, said first fragile portion is provided at each of said central upper-side corner part, said side upper-side corner part, said central lower-side corner part, and said side lower-side corner part, and said second fragile portion is provided at each of said central side face part, said side upper side face, and said side lower side face part.

15. The front vehicle-body structure of the vehicle of claim 3, wherein said bumper beam comprises a pair of flange portions which protrude upwardly and downwardly and extend in the vehicle width direction, and said corner portions where said first fragile portions are provided are located at positions which respectively overlap with said pair of flange portions in the vehicle elevational view.

16. The front vehicle-body structure of the vehicle of claim 7, wherein said corner portion positioned on an upper-face side of the crash can and said corner portion positioned on a lower-face side of the crash can are respectively configured to extend up to a foremost position, in the vehicle longitudinal direction, of a back face of said bumper beam which faces rearwardly.

17. The front vehicle-body structure of the vehicle of claim 7, wherein said crash can is configured to have a cross-shaped cross section in the vehicle elevational view, each of said side face portions comprises a central side face part, an upper side face part which is positioned on an upper-and-inward side, in the vehicle width direction, of the central side face part, and a lower side face part which is positioned on a lower-and-inward side, in the vehicle width direction, of the central side face part, said upper face portion comprises a central upper side part and a pair of side upper face parts which are positioned on lower-and-both sides, in the vehicle width direction, of the central upper side part, said lower face portion comprises a central lower side part and a pair of side lower face parts which are positioned on upper-and-both sides, in the vehicle width direction, of the central lower side part, said corner portion comprises a central upper-side corner part which is positioned between said upper side face part and said central upper face part, a side upper-side corner part which is positioned between said central side face part and said side upper face part, a central lower-side corner part which is positioned between said lower side face part and said central lower face part, and a side lower-side corner part which is positioned between said central side face part and said side lower face part, said first fragile portion is provided at each of said central upper-side corner part, said side upper-side corner part, said central lower-side corner part, and said side lower-side corner part, and said second fragile portion is provided at each of said central side face part, said side upper side face, and said side lower side face part.

18. The front vehicle-body structure of the vehicle of claim 7, wherein said bumper beam comprises a pair of flange portions which protrude upwardly and downwardly and extend in the vehicle width direction, and said corner portions where said first fragile portions are provided are located at positions which respectively overlap with said pair of flange portions in the vehicle elevational view.

19. The front vehicle-body structure of the vehicle of claim 8, wherein said bumper beam comprises a pair of flange portions which protrude upwardly and downwardly and extend in the vehicle width direction, and said corner portions where said first fragile portions are provided are located at positions which respectively overlap with said pair of flange portions in the vehicle elevational view.

20. The front vehicle-body structure of the vehicle of claim 9, wherein said bumper beam comprises a pair of flange portions which protrude upwardly and downwardly and extend in the vehicle width direction, and said corner portions where said first fragile portions are provided are located at positions which respectively overlap with said pair of flange portions in the vehicle elevational view.

\* \* \* \* \*